(12) United States Patent
Da Silva et al.

(10) Patent No.: US 12,089,594 B2
(45) Date of Patent: Sep. 17, 2024

(54) STABILIZED CYCLOHEXANEDIONE OXIME COMPOSITION

(71) Applicant: Adama Agan Ltd., Ashdod (IL)

(72) Inventors: Tiago Elias Da Silva, Cambé (BR); Silvio Luiz Machado, Londrina (BR); Luiz Fernando Colla, Londrina (BR); Lior Ziserman, Holon (IL); Ronly Shapira, Ness Ziona (IL); Sergio Nahmoud, Ashdod (IL)

(73) Assignee: ADAMA AGAN LTD., Ashdod (IL)

( * ) Notice: Subject to any disclaimer, the term of this patent is extended or adjusted under 35 U.S.C. 154(b) by 193 days.

(21) Appl. No.: 17/275,973

(22) PCT Filed: Sep. 10, 2019

(86) PCT No.: PCT/IB2019/057625
§ 371 (c)(1),
(2) Date: Mar. 12, 2021

(87) PCT Pub. No.: WO2020/053763
PCT Pub. Date: Mar. 19, 2020

(65) Prior Publication Data
US 2022/0030858 A1 Feb. 3, 2022

Related U.S. Application Data

(60) Provisional application No. 62/731,106, filed on Sep. 14, 2018.

(51) Int. Cl.
*A01N 35/10* (2006.01)
*A01N 25/02* (2006.01)
*A01N 25/22* (2006.01)
*A01N 25/30* (2006.01)
*A01N 43/40* (2006.01)

(52) U.S. Cl.
CPC ............ *A01N 35/10* (2013.01); *A01N 25/02* (2013.01); *A01N 25/22* (2013.01); *A01N 25/30* (2013.01); *A01N 43/40* (2013.01)

(58) Field of Classification Search
CPC ........ A01N 35/10; A01N 25/02; A01N 25/22; A01N 25/30; A01N 43/40; A01G 13/00; A01P 13/00
USPC ......................................................... 504/130
See application file for complete search history.

(56) References Cited

U.S. PATENT DOCUMENTS

| | | | |
|---|---|---|---|
| 10,772,323 B2 | 9/2020 | Sharma et al. | |
| 2003/0125211 A1 | 7/2003 | Woznica et al. | |
| 2006/0183642 A1 | 8/2006 | Otsubo | |
| 2008/0004182 A1* | 1/2008 | Linton | A01N 43/40 504/251 |
| 2010/0234232 A1 | 9/2010 | Dairiki et al. | |
| 2011/0015074 A1 | 1/2011 | Seckinger | |
| 2018/0153161 A1* | 6/2018 | Sharma | A01N 25/02 |
| 2018/0213775 A1 | 8/2018 | Zhang | |

FOREIGN PATENT DOCUMENTS

| | | | |
|---|---|---|---|
| CN | 1759673 A | 4/2006 | |
| CN | 101855009 A | 10/2010 | |
| CN | 102318602 | 1/2012 | |
| CN | 102318602 A | 1/2012 | |
| CN | 102469792 A | 5/2012 | |
| CN | 102315602 B | 4/2014 | |
| CN | 102318602 B | 4/2014 | |
| CN | 103960243 A | 8/2014 | |
| WO | WO-2007050090 A1 * | 5/2007 | ............ A01N 35/10 |
| WO | WO 2009/063608 A1 | 5/2009 | |
| WO | WO 2011/011265 A2 | 1/2011 | |
| WO | WO 2016/102504 A1 | 6/2016 | |
| WO | WO 2016/196130 A1 | 12/2016 | |

OTHER PUBLICATIONS

International Preliminary Report on Patentability issued Mar. 9, 2021 in connection with PCT International Application No. PCT/IB2019/057625.
Dec. 10, 2021 Office Action issued in connection with corresponding Chinese patent application No. 201980071751.3.
Costa, N. V. et al. "Glyphosate Tolerant Volunteer Corn Control at Two Development Stages." Planta Daninha, vol. 32, No. 4 (Dec. 1, 2014), pp. 675-682, XP55639588.
International Search Report issued Nov. 18, 2019 in connection with PCT International Application No. PCT/IB2019/057625.
Written Opinion of the International Searching Authority issued Nov. 18, 2019 in connection with PCT International Application No. PCT/IB2019/057625.
Aug. 30, 2021 Office Action issued in connection with corresponding Chinese patent application No. 201980071751.3, including English translation.
Aug. 23, 2021 Search Report issued in connection with corresponding Chinese patent application No. 201980071751.3.
Apr. 30, 2021 Communication issued in connection with European patent application No. 19769920.0.
Costa, N.V. et al., "Glyphosate Tolerant Volunteer Corn Control at Two Development Stages", Planta Daninha, 2014, vol. 32, pp. 675-682.
Data Sheet: Starane 200 EC, Dow Agrosciences Southern Africa Pty Ltd, Jan. 10, 2017.
Data Sheet: Solvesso 150 Aromatic Fluid, Union Petrochemical Public Company Limited, Jan. 9, 2018.
Data Sheet: Solvesso 150 ND Aromatic Fluid, ExxonMobil, Mar. 12, 2021.
Data Sheet: Soprophor BSU, Solvay.
Data Sheet: Synperonic A20, Croda Crop Care.

(Continued)

*Primary Examiner* — Frederick F Krass
*Assistant Examiner* — Lucy M Tien
(74) *Attorney, Agent, or Firm* — Gary J. Gershik

(57) ABSTRACT

The invention relates to stable liquid compositions comprising cyclohexanedione oxime herbicides (preferably clethodim), a water miscible solvent (preferably alkyl benzene), and at least one non-ionic surfactant (preferably mixture of lower HLB surfactant with higher HLB surfactant, or alternatively mixture of high HLB surfactants and fluroxypyr meptyl) and uses thereof.

24 Claims, No Drawings

(56) References Cited

OTHER PUBLICATIONS

Arysta: "Select EC Herbicide Canada", MSDS, (Oct. 5, 2017), pp. 1-9, XP93068615, https://agriculture.basf.ca/content/dam/cxm/agriculture/canada/english/agriculture/west/products/documents/product-documents/10404Sds-SELECTecHERBICIDEUsCanEn05102017.pdf.

Arysta: "Select 240 EC Brasil", Ficha de Informagbes de Seguranga de Produto Qufmico, (Jul. 13, 2018), pp. 1-21, XP93068890, https://www.uniagronegocios.com.br/cms/assets/uploads/files/67cd4-fispq-select.pdf.

Oct. 28, 2021 Response to Apr. 30, 2021 Communication pursuant to Rules 161(1) and 162 EPC filed with the European Patent Office in connection with European Application No. 19769920.0.

May 12, 2023 Third Party Observations under Article 115 EPC filed with the European Patent Office in connection with European Application No. 19769920.0.

Aug. 4, 2023 Communication pursuant to Article 94(3) EPC issued by the European Patent Office in connection with European Application No. 19769920.0.

Reply to Third Party Opinion filed on Dec. 22, 2023 in connection with the subject application's counterpart Brazilian application, i.e. Brazilian Application No. 10 2019 019008 6, including English translation.

Third Party Opinion filed on Sep. 27, 2023 in connection with the subject application's counterpart Brazilian application, i.e. Brazilian Application No. 10 2019 019008 6, including English translation.

\* cited by examiner

STABILIZED CYCLOHEXANEDIONE OXIME COMPOSITION

CROSS-REFERENCE TO RELATED APPLICATIONS

This application is a § 371 national stage of § 371 national stage of PCT International Application No. PCT/IB2019/057625, filed Sep. 10, 2019, claiming the benefit of U.S. Provisional Application No. 62/731,106, filed Sep. 14, 2018, the contents of each of which are hereby incorporated by reference into the application.

Throughout this application various publications are referenced. The disclosures of these documents in their entireties are hereby incorporated by reference into this application in order to more fully describe the state of the art to which this invention pertains.

TECHNICAL FIELD

The invention relates to herbicidal compositions comprising cyclohexanedione oxime herbicides and uses thereof.

BACKGROUND

Cyclohexanedione oximes are known as effective herbicides against a variety of post-emergent grass weeds. Cyclohexanedione oxime is a class of herbicide that inhibits fatty acid synthesis by inhibition of acetyl CoA carboxylase (ACCase). Cyclohexanedione oximes refer but are not limited to clethodim, sethoxydim, cycloxydim, alloxydim, tralkoxydim, tepraloxydim, clefoxydim, clefoxyfim, butroxydim and profoxydim.

Cyclohexanedione oximes are very sensitive and influenced rapidly from different additives. Formulating cyclohexanedione oximes is challenging due to this sensitivity.

Cyclohexanedione oximes such as (5RS)-2{(E)-1-[(2E)-3-chloroallyloxyimino]propyl}-5-[(2RS)-2-(ethylthio)propyl]-3-hydroxycyclohex-2-en-1-one (clethodim) are chemically unstable compounds and rapidly decompose under various conditions such as sunlight, high temperature and protic environments. For clethodim, the main decomposition products are sulfoxide, sulfone and oxazole sulfone. Another decomposition product of clethodim is HOCAL, O-(3-chloro-2-propenyl) hydroxylamine.

Clethodim decomposes rapidly in a composition and also on the leaf surface due to the formation of hydrochloric acid by an acid-catalyzed reaction and photolysis in the presence of water.

In a composition, the presence of other active and non-active ingredients affects the stability of the clethodim.

In the prior art, clethodim is formulated in different compositions comprising stabilizing agents and/or adjuvants.

U.S. Pat. No. 5,084,087 discloses a ready to dilute adjuvant-containing post-emergent herbicidal composition comprising a mixture of one or more herbicidal compounds, a polyoxyalkylene non-ionic surfactant having a hydrophilic-lipophilic balance (HLB) of from 10 to about 14, an anionic surfactant selected from the dialkyl metal sulfosuccinates and the metal alkylbenzene sulfonates, optionally a low foaming polyoxyalkylene non-ionic surfactant having an HLB of less than 10, and a lower alkanol ester of a long chain fatty acid.

WO2006050141 discloses an herbicidal composition comprising (a) an effective amount of an herbicidal cyclohexanedione oxime compound or agriculturally acceptable salt or ester thereof, (b) one or more esters of a fatty acid; and (c) one or more non-ionic surfactant selected from the polyoxyethylene plant oils and polyoxyethylene sorbitan fatty acid esters. As additional, optional, components, one or both of (d) an anionic surfactant and (e) a hydrocarbon solvent may be used.

US2006223710 discloses an herbicidal composition comprising clethodim wherein the amount of water is less than 0.2%.

WO2007050090 discloses a composition comprising clethodim and a mixture of fatty acid, non-ionic surfactant, POE and tallow amine ether sulfate. The composition excludes two specific anionic surfactants.

WO2011011265 discloses a composition comprising an active herbicide, in particular, a cyclohexanedione oxime herbicide, a stabilizer and epoxidized compounds.

WO2016196130 discloses a composition comprising a cyclohexanedione oxime compound or agriculturally acceptable salt thereof; and an effective amount of one or more stabilizing surfactant to provide a stabilized cyclohexanedione oxime. The disclosure teaches that it is necessary to combine non-ionic and anionic surfactants to stabilize the emulsion and in this case the stability of the clethodim is decreased.

CN 101999354 discloses a composition comprising clethodim, fomesafen, solvents, emulsifiers, and stabilizers and synergist wherein the stabilizer is organic bentonite, white carbon, black or light calcium carbonate and the emulsifier is a non-ionic or anionic surface.

Based on the disclosures discussed above, there is a need to develop a stable composition comprising clethodim in which the clethodim's rate of degradation is decreased and the concentration of the clethodim is maintained over a longer period of time.

In recent years, the need for new agrochemical compositions with high performance and low clethodim degradation has been increasing.

There is a need to develop a highly physically and chemically stable composition, which has high stability during the preparation, storage and application process of the composition.

SUMMARY OF THE INVENTION

The present invention provides a stable, liquid composition comprising (a) an amount of a cyclohexanedione oxime compound; (b) a low water miscible organic solvent; and (c) at least one non-ionic surfactant.

The present invention provides a stable, liquid composition comprising (a) an amount of a cyclohexanedione oxime compound; (b) a low water miscible organic solvent; and (c) at least one non-ionic surfactant; wherein the composition is substantially free of ionic surfactant.

The present invention provides a stable, liquid composition comprising (a) an effective amount of a cyclohexanedione oxime compound; (b) a low water miscible organic solvent; and (c) at least two non-ionic surfactants; wherein the composition is substantially free of ionic surfactant.

The present invention provides a stable, liquid composition comprising (a) an amount of a cyclohexanedione oxime compound; (b) a low water miscible organic solvent; and (c) at least two non-ionic surfactants; wherein the composition is substantially free of ionic surfactant.

The present invention provides a stable, liquid composition comprising: a) an effective amount of a cyclohexanedione oxime compound; (b) a low water miscible organic solvent; (c) at least one non-ionic polymeric surfactants.

The present invention provides a stable, liquid composition comprising (a) an amount of a cyclohexanedione oxime compound; (b) a low water miscible organic solvent; and (c) at least one non-ionic polymeric surfactant.

The present invention provides a stable, liquid composition comprising: a) an effective amount of a cyclohexanedione oxime compound; (b) a low water miscible organic solvent; (c) at least two non-ionic surfactants; and (d) at least one of the surfactants is polymeric.

The present invention provides a stable, liquid composition comprising: a) an amount of a cyclohexanedione oxime compound; (b) a low water miscible organic solvent; (c) at least two non-ionic surfactants wherein at least one of the non-ionic surfactants is polymeric.

The present invention provides a stable, liquid composition comprising (a) an effective amount of a cyclohexanedione oxime compound; (b) a low water miscible organic solvent; and (c) at least two non-ionic surfactants with proviso that the composition comprises ionic surfactant in amount of less than 2% by weight based on the total weight of the composition.

The present invention provides a stable, liquid composition comprising (a) an amount of a cyclohexanedione oxime compound; (b) a low water miscible organic solvent; and (c) at least two non-ionic surfactants with proviso that the composition comprises ionic surfactant in amount of less than 2% by weight based on the total weight of the composition.

The present invention provides a stable, liquid composition comprising: a) an effective amount of a cyclohexanedione oxime compound; (b) a low water miscible organic solvent; (c) at least two non-ionic surfactants; and (d) a polyalkoxylated alkyl ether with proviso that the composition comprises ionic surfactant in amount of less than 2% by weight based on the total weight of the composition.

The present invention provides a stable, liquid composition comprising: a) an amount of a cyclohexanedione oxime compound; (b) a low water miscible organic solvent; (c) at least two non-ionic surfactants; and (d) a polyalkoxylated alkyl ether with proviso that the composition comprises ionic surfactant in amount of less than 2% by weight based on the total weight of the composition.

The present invention provides a stable, liquid composition comprising: a) an effective amount of a cyclohexanedione oxime compound; (b) a low water miscible organic solvent; (c) at least one non-ionic surfactants; and (d) a polyalkoxylated alkyl ether with proviso that the composition comprises ionic surfactant in amount of less than 2% by weight based on the total weight of the composition.

The present invention provides a stable, liquid composition comprising: a) an amount of a cyclohexanedione oxime compound; (b) a low water miscible organic solvent; (c) at least one non-ionic surfactant; and (d) a polyalkoxylated alkyl ether with proviso that the composition comprises ionic surfactant in amount of less than 2% by weight based on the total weight of the composition.

The present invention provides a method for stabilizing a liquid composition comprising cyclohexanedione oxime compound and low water miscible organic solvent, the method comprising formulating the composition in absence of ionic surfactant and in presence of at least two non-ionic surfactants.

The present invention provides a use of at least one non-ionic surfactant for stabilizing a liquid composition comprising clethodim and low water miscible organic solvent.

The present invention provides a use of a combination of at least two non-ionic surfactants for stabilizing a liquid composition comprising clethodim and low water miscible organic solvent.

The present invention provides a method of physically stabilizing a liquid composition of cyclohexanedione oxime compound in low water miscible organic solvent in absence of ionic surfactant after dilution wherein the method comprises formulating the composition to have a high HLB by using at least one polymeric surfactant having a high HLB value.

The present invention provides a method of physically stabilizing a liquid composition of cyclohexanedione oxime compound in low water miscible organic solvent in absence of ionic surfactant after dilution wherein the method comprises formulating the composition to have a high HLB by using at least two polymeric surfactants wherein at least one surfactant possesses a high HLB value and at least one surfactant possesses a low HLB value.

The present invention provides a method for eliminating undesired vegetation, comprising the step of contacting the undesired vegetation, or an area susceptible to undesired vegetation growth, with any one of the compositions described herein.

The present invention also provides a method of controlling weeds, comprising applying any one of the stable liquid compositions described herein to a weed, a portion of a weed, an area or soil adjacent to a weed, and/or a seed of a weed so as to thereby control the weed.

The present invention also provides a method of controlling weeds in a plant crop, comprising applying any one of the stable liquid compositions described herein to a weed, a portion of a weed, an area or soil adjacent to a weed, and/or a seed of a weed so as to thereby control the weed.

The present invention also provides a process for preparing any one of the stable liquid compositions described herein, wherein the process comprises the steps of:
(i) mixing water miscible organic solvent with at least one non-ionic surfactant; and
(ii) adding clethodim to the solution of step (i) and mixing until a solution is obtained.

DETAILED DESCRIPTION

Definitions

Prior to setting forth the present subject matter in detail, it may be helpful to provide definitions of certain terms to be used herein. Unless defined otherwise, all technical and scientific terms used herein have the same meaning as is commonly understood by one of skill in the art to which this subject matter pertains. The following definitions are provided for clarity.

The term "a" or "an" as used herein includes the singular and the plural, unless specifically stated otherwise. Therefore, the terms "a," "an," or "at least one" can be used interchangeably in this application.

As used herein, the term "about" when used in connection with a numerical value includes ±10% from the indicated value. In addition, all ranges directed to the same component or property herein are inclusive of the endpoints, are independently combinable, and include all intermediate points and ranges. It is understood that where a parameter range is provided, all integers within that range, and tenths thereof, are also provided by the invention. For example, "0.1-80%" includes 0.1%, 0.2%, 0.3%, etc. up to 80%.

As used herein "substantially free" means that the composition contains an amount of ionic surfactant that does not significantly affect the physical and chemical stability of the composition, including the physical and chemical stability of the cyclohexanedione oxime compound in the composition. In some embodiments, the composition comprises less than 2% by weight based on the total weight of the composition, of ionic surfactant. In preferred embodiments, the composition comprises less than 0.3% by weight based on the total weight of the composition of ionic surfactant by weight based on the weight of the composition. In more preferred embodiments, the composition is free of ionic surfactant.

As used herein, the term "pesticide" broadly refers to an agent that can be used to control and/or kill a pest. The term is understood to include but is not limited to fungicides, insecticides, nematicides, herbicides, acaricides, parasiticides or other control agents. For chemical classes and applications, as well as specific compounds of each class, see "The Pesticide Manual Thirteenth Edition" (British Crop Protection Council, Hampshire, U K, 2003), as well as "The e-Pesticide Manual, Version 3" (British Crop Protection Council, Hampshire, UK, 2003-04), the contents of each which are incorporated herein by reference in their entirety.

As used herein the term "plant" or "crop" includes reference to whole plants, plant organs (e.g. leaves, stems, twigs, roots, trunks, limbs, shoots, fruits etc.), plant cells, or plant seeds. This term also encompasses plant crops such as fruits. In yet another embodiment, the term "plant" may include the propagation material thereof, which may include all the generative parts of the plant such as seeds and vegetative plant material such as cuttings and tubers, which can be used for the multiplication of the plant. This includes seeds, tubers, spores, corms, bulbs, rhizomes, sprouts basal shoots, stolons, and buds and other parts of plants, including seedlings and young plants, which are to be transplanted after germination or after emergence from soil.

As used herein, the term "locus" includes not only areas where weeds may already be growing, but also areas where weeds have yet to emerge, and also to areas under cultivation.

As used herein, the term "mixture" or "combination" refers, but is not limited to, a combination in any physical form, e.g., blend, solution, alloy, or the like.

As used herein, the term "effective amount" refers to an amount of the compound that, when ingested, contacted with or sensed, is sufficient to achieve a good level of control.

As used herein, the phrase "agrochemically acceptable salt" means salt which is known and accepted in the art for use in agricultural or horticultural use.

As used herein, the term "adjuvant" is broadly defined as any substance that itself is not an herbicide but which enhances or is intended to enhance the effectiveness of the herbicide with which it is used. Adjuvants may be understood to include, spreading agents, penetrants, compatibility agents, and drift retardants.

As used herein, the term "additive" is defined as any substance that itself is not an herbicide but is added to the composition such as sticking agents, surfactants, synergists, buffers, acidifiers, defoaming agents and thickeners.

As used herein, the term "stable" refers to chemical and/or physical stabilization.

As used herein, the term "stable" when used in connection with chemical stabilization means that no significant decomposition of the active ingredients in the composition is observable after at least 1 year of storage at temperature up to 30° C. or after any standard accelerate storage stability test (e.g. 2 weeks of storage at a temperature of 54° C.). Significant decomposition is more than 6% of degradation.

As used herein, the term "stable" when used in connection with physical stabilization, used in connection with a composition means that the composition compatible with the emulsion stability test according CIPAC standard (e.g. MT 36.3) and resulted in cream concentration equal or less than 2% after 2 hours.

As used herein the term "low water miscible" refers to poor solubility of water in the organic solvent. When referring to low water solubility in the organic solvent it means the solubility of water in the organic solvent at temperature of 20° C. is less than 1% by weight based on the total amount of solvent, or 1.0 mg/100 ml. Especially preferred are solvents with solubility of less than 0.7 mg/100 ml.

As used herein, "polyalkoxyl or polyalkoxylated" refers to polyalkylene oxide. Polyalkylene oxides refer to C2-C5 hydroxy-hydrocarbon such as ethylene oxide, propylene oxide and butylene oxide.

The stability tests are according to CIPAC methodologies.

As used herein, the term "ionic surfactant" means surfactants that have an anionic, cationic zwitterionic functional group such as sulfonate group, phosphate group and ammonium group.

As used herein, the term "tank mix" means that two or more components (including one or more chemical pesticides) or compositions are mixed in the spray tank at the time of spray application. In some embodiments, the term "tank mix" means that two or more chemical pesticides or compositions are mixed in the spray tank at the time of spray application.

As used herein, the term "safener" refers to an agent that increases the tolerance of plants to herbicides without significantly affecting the effectiveness of the active ingredients.

As used herein, the term "thickener" refers to an agent that increases the viscosity of a liquid composition without essentially changing other properties of the composition.

Cyclohexanedione oximes are known as effective herbicides. Therefore, the terms "cyclohexanedione oxime herbicide", "cyclohexanedione oxime" and "cyclohexanedione oxime compound" may be used interchangeably in this application.

Cyclohexanedione Oxime Liquid Compositions

The present invention provides a non-aqueous composition comprising cyclohexanedione oxime, wherein the composition is chemically and physically stable. Ionic surfactants are necessary for stabilize a non-aqueous composition after dilution to obtain emulsion. However, the chemical stability of cyclohexanedione oxime is significantly affected by an ionic environment. A new chemical and physical stabilizing system for cyclohexanedione oxime composition was developed. It was found that compositions comprising a cyclohexanedione oxime are chemically and physically stable when the ionic surfactant is excluded and a system of at least two non-ionic surfactants is added.

Stability of the composition is tested by CIPAC methodologies.

The test is standard in the relevant industry before and after the storage stability test (2 weeks at 54° C. or equivalent—after 8 weeks at 40° C.).

Normal storage condition is two years storage at room temperature or under an accelerated storage stability test: after 2 weeks at 54° C. or equivalent—after 8 weeks at 40° C. or after 12 weeks at 35° C.

The present invention provides a stable, liquid composition comprising (a) an amount of a cyclohexanedione oxime compound; (b) a low water miscible organic solvent; and (c) at least one non-ionic surfactant.

The present invention provides a stable, liquid composition comprising (a) an amount of a cyclohexanedione oxime compound; (b) a low water miscible organic solvent; and (c) at least one non-ionic polymeric surfactant.

The present invention provides a stable, liquid composition comprising (a) an amount of a cyclohexanedione oxime compound; (b) a low water miscible organic solvent; and (c) at least one non-ionic surfactant, wherein the composition is substantially free of ionic surfactant.

The present invention provides a stable, liquid composition comprising (a) an amount of a cyclohexanedione oxime compound; (b) a low water miscible organic solvent, and (c) at least two non-ionic surfactants.

The present invention provides a stable, liquid composition comprising (a) an effective amount of a cyclohexanedione oxime compound; (b) a low water miscible organic solvent; and (c) at least two non-ionic surfactants; wherein the composition is substantially free of ionic surfactant.

The present invention provides a stable, liquid composition comprising (a) an amount of a cyclohexanedione oxime compound; (b) a low water miscible organic solvent; and (c) at least two non-ionic surfactants, wherein the composition is substantially free of ionic surfactant.

The present invention provides a stable, liquid composition comprising (a) an amount of a cyclohexanedione oxime compound; (b) a low water miscible organic solvent; (c) at least one non-ionic surfactant, and (d) at least one polymeric surfactant.

The present invention provides a stable, liquid composition comprising (a) an amount of a cyclohexanedione oxime compound; (b) a low water miscible organic solvent; (c) at least one non-ionic surfactant, and (d) at least one non-ionic polymeric surfactant.

The present invention provides a stable, liquid composition comprising: a) an amount of a cyclohexanedione oxime compound; (b) a low water miscible organic solvent; (c) at least two non-ionic surfactants; and (d) at least one of the surfactants is polymeric.

The present invention provides a stable, liquid composition comprising: a) an amount of a cyclohexanedione oxime compound; (b) a low water miscible organic solvent; (c) at least two non-ionic surfactants wherein at least one of the non-ionic surfactants is polymeric.

The present invention provides a stable, liquid composition comprising (a) an effective amount of a cyclohexanedione oxime compound; (b) a low water miscible organic solvent; and (c) at least two non-ionic surfactants; with proviso that the composition comprises ionic surfactant in amount of less than 2% by weight based on the total weight of the composition.

The present invention provides a stable, liquid composition comprising (a) an amount of a cyclohexanedione oxime compound; (b) a low water miscible organic solvent; and (c) at least two non-ionic surfactants; with proviso that the composition comprises ionic surfactant in amount of less than 2% by weight based on the total weight of the composition.

The present invention provides a stable, liquid composition comprising (a) an amount of a cyclohexanedione oxime compound; (b) a low water miscible organic solvent; and (c) at least two non-ionic surfactants.

The present invention provides a liquid composition comprising (a) an amount of a cyclohexanedione oxime compound; (b) a low water miscible organic solvent; and (c) at least two non-ionic surfactants.

In some embodiments, the composition is substantially free of ionic surfactants.

In some embodiments, the composition comprises at least two non-ionic surfactants. In some embodiments, the composition comprises at least three non-ionic surfactants. In some embodiments, the composition comprises two non-ionic surfactants. In some embodiments, the composition comprises three non-ionic surfactants.

In some embodiments, at least one of the non-ionic surfactants is polymeric. In some embodiments, the composition comprises a polymeric surfactant. In some embodiments, the composition comprises a non-ionic polymeric surfactant.

In some embodiments, at least one of the non-ionic surfactants has a high hydrophilic-lipophilic balance (HLB). In some embodiments, the high HLB non-ionic surfactant has an HLB of 9 or higher. In some embodiments, at least two of the non-ionic surfactants has a high hydrophilic-lipophilic balance (HLB). In some embodiments, the high HLB non-ionic surfactant has an HLB of 9 or higher. In some embodiments, the high HLB non-ionic surfactant has an HLB of 10 or higher. In some embodiments, the high HLB non-ionic surfactant has an HLB of 11 or higher. In some embodiments, the high HLB non-ionic surfactant has an HLB of 12 or higher. In some embodiments, the high HLB non-ionic surfactant has an HLB of 13 or higher. In some embodiments, the high HLB non-ionic surfactant has an HLB of 14 or higher. In some embodiments, the high HLB non-ionic surfactant has an HLB of 15 or higher. In some embodiments, the high HLB non-ionic surfactant has an HLB of 16 or higher.

In some embodiments, at least one of the non-ionic surfactants has a low HLB. In some embodiments, the low HLB non-ionic surfactant has an HLB of 12 or lower. In some embodiments, the low HLB non-ionic surfactant has an HLB of 11 or lower. In some embodiments, the low HLB non-ionic surfactant has an HLB of 10 or lower. In some embodiments, the low HLB non-ionic surfactant has an HLB of 9 or lower. In some embodiments, the low HLB non-ionic surfactant has an HLB of 8 or lower. In some embodiments, the low HLB non-ionic surfactant has an HLB of 7 or lower. In some embodiments, the low HLB non-ionic surfactant has an HLB of 6 or lower.

In some embodiments, at least one of the non-ionic surfactants has a high HLB of 9 or higher and at least one of the non-ionic surfactants has a low HLB of 12 or lower, wherein the high HLB non-ionic surfactant has an HLB that is higher than the low HLB non-ionic surfactant.

The present invention provides a liquid composition comprising (a) an amount of a cyclohexanedione oxime compound; (b) a low water miscible organic solvent; and (c) at least two non-ionic surfactants; wherein:
  (i) the composition is substantially free of ionic surfactant,
  (ii) at least one of the non-ionic surfactants is polymeric, and
  (iii) at least one of the non-ionic surfactants has a high HLB of 9 or higher.

In some embodiments, at least two of the non-ionic surfactants have a high HLB of 9 or higher.

The present invention provides a liquid composition comprising (a) an amount of a cyclohexanedione oxime compound; (b) a low water miscible organic solvent; and (c) at least two non-ionic surfactants; wherein:
  (i) the composition is substantially free of ionic surfactant, (ii) at least one of the non-ionic surfactants is polymeric, and (iii) at least one of the non-ionic surfactants has a high HLB of 9 or higher and at least one of the non-ionic surfactants has a low HLB of 12 or lower, and wherein the high HLB non-ionic surfactant has an HLB that is higher than the low HLB non-ionic surfactant.

The present invention provides a liquid composition comprising (a) an amount of a cyclohexanedione oxime compound; (b) a low water miscible organic solvent; and (c) at least two non-ionic surfactants; wherein:

(i) the composition is substantially free of ionic surfactant, (ii) at least one of the non-ionic surfactants is polymeric, and (iii) at least one of the non-ionic surfactants has high HLB and at least one of the non-ionic surfactants has a low HLB.

In some embodiments, the composition comprises at least one low HLB component. In some embodiments, the low HLB component is a non-ionic surfactant. In some embodiments, the low HLB component is an additional pesticide. In some embodiments, the additional pesticide is an herbicide. In some embodiments, the low HLB component is an additive. In some embodiments, the low HLB component is an adjuvant. In some embodiments, the low HLB component is a stabilizer.

In some embodiments, the non-ionic surfactant with low HLB is partially or fully replaced with an additional component in the composition.

In some embodiments, low HLB is less than 10, is less than 9, is less than 8, is less than 7, is less than 6.

In some embodiments, the composition comprises at least one high HLB component. In some embodiments, the high HLB component is a non-ionic surfactant. In some embodiments, the high HLB component is an additional pesticide. In some embodiments, the additional pesticide is an herbicide. In some embodiments, the high HLB component is an additive. In some embodiments, the high HLB component is an adjuvant. In some embodiments, the high HLB component is a stabilizer.

In some embodiments, the non-ionic surfactant with high HLB is partially or fully replaced with an additional component in the composition.

In some embodiments, high HLB is more than 9, more than 10, is more than 11, is more than 12, is more than 13, is more than 14, is more than 15, is more than 16.

In some embodiments, the amount of the cyclohexanedione oxime compound is effective for controlling weed. In some embodiments, the amount of the cyclohexanedione oxime compound is effective for preventing weed.

In some embodiments, cyclohexanedione oxime compound refers to neutral derivative, agriculturally acceptable salt or ester thereof.

In some embodiments, the cyclohexanedione oxime compound is clethodim.

In some embodiments, the composition comprises 50-400 g/L of the cyclohexanedione oxime compound. In some embodiments, the composition comprises 100-400 g/L of the cyclohexanedione oxime compound. In some embodiments, the composition comprises 100-300 g/L of the cyclohexanedione oxime compound. In some embodiments, the composition comprises 100-200 g/L of the cyclohexanedione oxime compound. In some embodiments, the composition comprises about 140 g/L of the cyclohexanedione oxime compound. In some embodiments, the composition comprises 200-300 g/L of the cyclohexanedione oxime compound. In some embodiments, the composition comprises about 240 g/L of the cyclohexanedione oxime compound. In some embodiments, the composition comprises about 400 g/L of the cyclohexanedione oxime compound.

In some embodiments, the composition comprises from about 1% to about 20% by weight of non-ionic surfactant(s) based on the total weight of the composition. In some embodiments, the composition comprises from about 1% to about 15% by weight of non-ionic surfactant(s) based on the total weight of the composition. In some embodiments, the composition comprises from about 5% to about 10% by weight of non-ionic surfactant(s) based on the total weight of the composition. In some embodiments, the composition comprises about 5% by weight of non-ionic surfactant(s) based on the total weight of the composition. In some embodiments, the composition comprises about 6% by weight of non-ionic surfactant(s) based on the total weight of the composition. In some embodiments, the composition comprises about 7% by weight of non-ionic surfactant(s) based on the total weight of the composition. In some embodiments, the composition comprises about 8% by weight of non-ionic surfactant(s) based on the total weight of the composition. In some embodiments, the composition comprises about 9% by weight of non-ionic surfactant(s) based on the total weight of the composition. In some embodiments, the composition comprises about 10% by weight of non-ionic surfactant(s) based on the total weight of the composition.

In some embodiments, composition comprises less than 2% by weight of ionic surfactant based on the total weight of the composition. In some embodiments, composition comprises less than 1.5% by weight of ionic surfactant based on the total weight of the composition. In some embodiments, composition comprises less than 1% by weight of ionic surfactant based on the total weight of the composition. In some embodiments, composition comprises less than 0.5% by weight of ionic surfactant based on the total weight of the composition. In some embodiments, the stable liquid composition is free of ionic surfactant.

In some embodiments, the composition is stable. In some embodiments, the composition is chemically stable. In some embodiments, the composition is physically stable. In some embodiments, physical stability is assessed after the composition is mixed with water. In some embodiments, physical stability is assessed after the composition is diluted with water. In some embodiments, the diluted composition is physically stable.

In some embodiments, less than 6% of decomposition of the cyclohexanedione oxime compound is observed after storage at 54° C. for 14 days. In some embodiments, less than 5% of decomposition of the cyclohexanedione oxime compound is observed after storage at 54° C. for 14 days.

In some embodiments, the composition comprises less than 2% of cream after 2 hours of storage. In some embodiments, the composition comprises less than 1.5% of cream after 2 hours of storage. In some embodiments, the composition comprises less than 1% of cream after 2 hours of storage. In some embodiments, the composition comprises less than 0.5% of cream after 2 hours of storage.

In some embodiments, the non-ionic surfactant is selected from the group consisting of alkyl phenol ethoxylates (NPE's and OPE's), hydrogenated castor oil ethoxylates (CO-5, CO-16, CO-25, CO-36, CO-40, HCO-16, HCO-25, HCO-36, HCO-40), tallow amine ethoxylates (TAM-2, TAM-8, TAM-15, etc.), natural and synthetic alcohol ethoxylates, C6-C20 alcohol ethoxylates (for example Tomadol®, Rhodasurf®, Neodol® 91-2.5, 91-6, 91-8, 23-3, 23-5, 23-7, 23-9, 25-3, 25-5, 25-7, 25-9, 27-3, 27-5, 27-7, 27-9, 45-7, 45-13, 1-3, 1-5, 1-7, 68-5, 68-20, 68-25, 68-40), alcohol ethoxylate blends, secondary alcohol ethoxylates (for example Tergitol™ 15-S Series), PEG's (polyethylene glycols) oleyl amine ethoxylates, coco amine ethoxylates, stearyl amine ethoxylates, polyalkoxylated alkyl ether, alkyl alkoxylated ether, sorbitan ester, sorbitan ester ethoxylates, polyalkoxylated plant oil, castor oil ethoxylates, EO-PO block copolymers/polymers (for example Pluronic® L61, L62, L62LF, L64), EO-PO-EO block copolymers/polymers (for example Synperonic® PE/L 61, Synperonic® PE/L 64), ABA block copolymers/polymers, random copolymers/polymers, star copolymers/polymers, graft copolymers/polymers, modified acrylic & vinylic polymers/copolymers, coco-, oleic-, stearic-, tall oil fatty-acid ethoxylates, cocamide monoethanolamine (MEA), cocamide diethanolamine (DEA), cocamide monoisopropanolamine (MIPA), ethoxylated tristyrylphenols (for example Soprophor® BSU, Soprophor® TS/54), etho-propoxylated tristyrylphenols (for example Soprophor® 796/P), etho-propoxylated fatty alcohols, etho-propoxylated alkylphenols, polyoxyethylenesorbitan monooleate, polyalkylene glycol ether, polyalkoxylated sorbitan fatty acid ester, polyoxyalkylene polyaryl ether, polyalkoxylated plant oil derivative, carboxylic amides, monoalkanolamine condensates, polyoxyethylene fatty acid amides and any combination thereof.

In some embodiments, the non-ionic surfactant is an ethoxylated compound. In some embodiments, the ethoxylated compound is selected from the group consisting of alkyl phenol ethoxylates (NPE's and OPE's), hydrogenated castor oil ethoxylates (CO-5, CO-16, CO-25, CO-36, CO-40, HCO-16, HCO-25, HCO-36, HCO-40), tallow amine ethoxylates (TAM-2, TAM-8, TAM-15, etc.), natural and synthetic alcohol ethoxylates, C6-C20 alcohol ethoxylates (for example Tomadol®, Rhodasurf®, Neodol® 91-2.5, 91-6, 91-8, 23-3, 23-5, 23-7, 23-9, 25-3, 25-5, 25-7, 25-9, 27-3, 27-5, 27-7, 27-9, 45-7, 45-13, 1-3, 1-5, 1-7, 68-5, 68-20, 68-25, 68-40), alcohol ethoxylate blends, secondary alcohol ethoxylates (for example Tergitol™ 15-S Series), PEG's (polyethylene glycols) oleyl amine ethoxylates, coco amine ethoxylates, stearyl amine ethoxylates, sorbitan ester ethoxylates, castor oil ethoxylates, EO-PO block copolymers/polymers (for example Pluronic® L61, L62, L62LF, L64), EO-PO-EO block copolymers/polymers (for example Synperonic® PE/L 61, Synperonic® PE/L 64), coco-, oleic, stearic-, tall oil fatty-acid ethoxylates, ethoxylated tristyrylphenols (for example Soprophor® BSU, Soprophor® TS/54), etho-propoxylated tristyrylphenols (for example Soprophor® 796/P), etho-propoxylated fatty alcohols, etho-propoxylated alkylphenols, polyoxyethylenesorbitan monooleate, polyalkoxylated sorbitan fatty acid ester, polyoxyalkylene polyaryl ether, polyalkoxylated plant oil derivative, carboxylic amides, monoalkanolamine condensates, polyoxyethylene fatty acid amides and any combination thereof.

In some embodiments, the ethoxylated compound comprises at least 20 EO. In some embodiments, the ethoxylated compound comprises at least 40 EO. In some embodiments, the ethoxylated compound comprises at least 50 EO. In some embodiments, the ethoxylated compound comprises 54 EO.

In some embodiments, the ethoxylated compound is ethoxylated castor oil.

In some embodiments, the polymeric non-ionic surfactant is selected from the group consisting of EO-PO block copolymers/polymers, EO-PO-EO block copolymers/polymers, ABA block copolymers/polymers, random copolymers/polymers, star copolymers/polymers, graft copolymers/polymers, modified acrylic & vinylic polymers/copolymers, polyalkoxylated alkyl ether, and any combination thereof.

In some embodiments, the composition further comprises polyalkoxylated alkyl ether.

In some embodiments, the alkyl is C1-C6 hydrocarbon chain. In some embodiments, the alkyl in the polyalkoxylated alkyl ether is a C1-C6 hydrocarbon chain.

In some embodiments, the polyalkoxylated alkyl ether is polyalkoxylated butyl ether.

In some embodiments, the alkoxylated refers to polyalkylene oxide.

Polyalkylene oxides may include but are not limited to ethylene oxide, propylene oxide and butylene oxide.

In some embodiments, the alkyl alkoxylated ether comprises a short alkyl chain, such as a methyl, ethyl, propyl or butyl group. In some embodiments, the alkyl alkoxylated ether comprises a long alkyl chain such as fatty alcohol, including unsaturated and/or branched fatty alcohol.

In some embodiments, the alkyl alkoxylated ether is open/free hydroxyl ether. In some embodiments, the alkyl alkoxylated ether is an end cap ether. In some embodiments, alkyl refers to short chain. Short chain refers to C1-C10. Examples of alkyl are methyl or ethyl groups. In some embodiments, alkyl refers to the long chain. Long chain refers to C10-C30. In some embodiments, the chain is saturated. In some embodiments, the alkyl is unsaturated. In some embodiments, the alkyl is branched.

End cap refers to a terminal hydroxyl group of certain alkyl alkoxylated ethers of the invention which are capped by an alkyl group, such a methyl, ethyl, benzyl or the like.

Polyalkoxylated alkyl ether refers to polymers and copolymers. Copolymer refers to block co-polymers and/or random co-polymers.

In some embodiments, alkoxy group refers but is not limited to ethylene oxide, propylene oxide, butylene oxide or combinations thereof.

Examples of a polyalkoxylated alkyl ether are ethoxypropoxy butyl ethers such as Ethylan™ NS 500 LQ (sold by Nouryon), Synergen SOC (sold by Clariant) and Brij™ IC20 (sold by Croda). In some embodiments, the polyalkoxylated butyl ether is Ethylan™ NS 500 LQ (sold by Nouryon).

Polyalkoxylated alkyl ethers may include but are not limited to alkoxylated alcohols (such as n-butyl alcohol poly glycol ether), random copolymers (such as ethylene oxide-propylene oxide block copolymers and ethylene oxide-butylene oxide block copolymers) block copolymers (such as ethylene oxide-propylene oxide block copolymers and ethylene oxide-butylene oxide block copolymers); or alkyl end capped alkoxylate ethers or combinations thereof.

In some embodiments, polyalkoxylated plant oil is selected from a group consisting of olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, and tall oil.

In some embodiments, the fatty acid in the polyalkoxylated sorbitan fatty acid ester is C10-C20.

In some embodiments, the polyalkoxylated sorbitan fatty acid ester is Polysorbate 80 (CAS No. 9005-65-6).

In some embodiments, the polyoxyalkylene polyaryl ether is ethoxylated tristyrylphenol ether.

In some embodiments, the polyoxyalkylene polyaryl ether is a polyoxyalkylene tristyryl phenyl ether. In some embodiments the polyoxyalkylene tristyryl phenyl ether is polyoxyethylene tristyryl phenyl ether. In some embodiments, the polyoxyalkylene tristyryl phenyl ether is polyoxyethylene polyoxypropylene tristyryl phenyl ether.

In some embodiments, the ethoxylated tristyrylphenol is Soprophor® BSU (sold by Solvay).

In some embodiments, the polyalkoxylated plant oil derivative is ethoxylated castor oil.

In some embodiments, the ethoxylated castor oil is Emulsogen® EL 360 (sold by Clariant).

In some embodiments, the alkoxylated refers to polyalkylene oxide.

Polyalkylene oxides may include but are not limited to ethylene oxide, propylene oxide and butylene oxide.

In some embodiments, the non-ionic surfactants have an HLB of 3-16. In some embodiments, the non-ionic surfactants have an HLB of 6-14. In some embodiments, the non-ionic surfactants have an HLB of 9-12.

In some embodiments, the high HLB non-ionic surfactant has an HLB of greater than 9. In some embodiments, the high HLB non-ionic surfactant has an HLB of greater than 10. In some embodiments, the high HLB non-ionic surfactant has an HLB of greater than 11. In some embodiments, the high HLB non-ionic surfactant has an HLB of greater than 12.

In some embodiments, the low HLB non-ionic surfactant has an HLB of less than 12. In some embodiments, the low HLB non-ionic surfactant has an HLB of less than 11. In some embodiments, the low HLB non-ionic surfactant has an HLB of less than 10. In some embodiments, the low HLB non-ionic surfactant has an HLB of less than 9. In some embodiments, the low HLB non-ionic surfactant has an HLB of less than 8.

In some embodiments, the high HLB non-ionic surfactant is selected from the group consisting of castor oil ethoxylates, ethoxylated tristyrylphenols, etho-propoxylated tristyrylphenols, sorbitan esters, sorbitan ester ethoxylates, etho-propoxylated fatty alcohols, etho-propoxylated alkylphenols, polyalkoxylated butyl ether, polyoxyethylenesorbitan monooleate and polyalkylene glycol ether.

In some embodiments, the low HLB non-ionic surfactant is selected from the group consisting of ABA block copolymers/polymers, EO-PO block copolymers/polymers, EO-PO-EO block copolymers/polymers, random copolymers/polymers and star copolymers/polymers.

In some embodiments, the copolymer is tri block copolymer.

In some embodiments, the tri block copolymer refers to co polymer of poly fatty acid and poly polyalkylene oxide.

In some embodiments, the tri block copolymer of poly fatty acid and poly polyalkylene oxide is a block copolymer of polyethylene glycol and 12-hydroxystearic acid.

In some embodiments, the block copolymer of polyethylene glycol and 12-hydroxystearic acid is Atlox™ 4912 (sold by Croda).

In some embodiments, the ABA block copolymer/polymer is based on 12 poly-hydroxysteric acid and polyethyleglycol (PEG). In some embodiments, the ABA block copolymer/polymer is Atlox™ 4912 (sold by Croda).

In some embodiments, the random copolymer/polymer is Atlox™ 4914 (sold by Croda). In some embodiments, the star copolymer/polymer is Atlox™ 4916 (sold by Croda).

In some embodiments, one of the non-ionic surfactants is monomeric.

In some embodiments, the monomeric non-ionic surfactant is a sorbitan ester ethoxylate.

In some embodiments, the non-ionic surfactant is a castor oil ethoxylate.

In some embodiments, the castor oil ethoxylate is Emulsogen® EL 360 (sold by Clariant). In some embodiments, the caster oil ethoxylate is Agnique® BL 4524 (sold by BASF). In some embodiments, the castor oil ethoxylate is Alkest® CSO 200 (sold by Oxiteno).

In some embodiments, the ethoxylated tristyrylphenol is Soprophor® BSU (sold by Solvay).

In some embodiments, the etho-propoxylated tristyrylphenol is Soprophor® 796/P (sold by Solvay).

In some embodiments, the polyalkoxylated butyl ether is Ethylan™ NS 500 LQ (sold by Nouryon).

In some embodiments, the polyoxyethylenesorbitan monooleate is Tween 80.

In some embodiments, the polyalkylene glycol ether is Atlas™ G 5000 (sold by Croda).

In some embodiments, the composition comprises two non-ionic surfactants. In some embodiments, the composition comprises at least three non-ionic surfactants. In some embodiments, the composition comprises three non-ionic surfactants.

In some embodiments, the composition comprises Agnique® BL 4524 and Ethylan™ NS 500 LQ.

In some embodiments, the composition comprises Atlox™ 4912 and Emulsogen® EL 360.

In some embodiments, the composition comprises Atlox™ 4912 and Soprophor® BSU.

In some embodiments, the composition comprises Atlox™ 4912 and Atlas™ G 5000.

In some embodiments, the composition comprises Ethylan™ NS 500 LQ and Alkest® CSO 200.

In some embodiments, the composition comprises less than 1.5% by weight of water based on the total weight of the composition. In some embodiments, the composition comprises less than 1% by weight of water based on the total weight of the composition. In some embodiments, the composition comprises less than 0.5% by weight of water based on the total weight of the composition. In some embodiments, the composition is substantially free of water. In some embodiments, the composition is free of water.

The present invention provides a stable, liquid composition comprising (a) an effective amount of a cyclohexanedione oxime compound; (b) a low water miscible organic solvent; (c) at least two non-ionic surfactants; and (d) a polyalkoxylated alkyl ether wherein the composition is substantially free of ionic surfactant.

The present invention provides a stable, liquid composition comprising (a) an amount of a cyclohexanedione oxime compound; (b) a low water miscible organic solvent; (c) at least two non-ionic surfactants; and (d) a polyalkoxylated alkyl ether wherein the composition is substantially free of ionic surfactant.

The present invention provides a stable, liquid composition comprising (a) an effective amount of a cyclohexanedione oxime compound; (b) a low water miscible organic solvent; (c) at least one non-ionic surfactant; and (d) a polyalkoxylated alkyl ether wherein the composition is substantially free of ionic surfactant.

The present invention provides a stable, liquid composition comprising (a) an amount of a cyclohexanedione oxime compound; (b) a low water miscible organic solvent; (c) at least one non-ionic surfactant; and (d) a polyalkoxylated alkyl ether wherein the composition is substantially free of ionic surfactant.

The present invention provides a stable, liquid composition comprising (a) an effective amount of a cyclohexanedione oxime compound; (b) a low water miscible organic solvent; (c) at least two non-ionic surfactants; and (d) a polyalkoxylated alkyl ether with proviso that the composition comprises ionic surfactant in amount of less than 2% by weight based on the total weight of the composition.

The present invention provides a stable, liquid composition comprising (a) an amount of a cyclohexanedione oxime compound; (b) a low water miscible organic solvent; (c) at least two non-ionic surfactants; and (d) a polyalkoxylated alkyl ether with proviso that the composition comprises ionic surfactant in amount of less than 2% by weight based on the total weight of the composition.

The present invention provides a stable, liquid composition comprising (a) an effective amount of a cyclohexanedione oxime compound; (b) a low water miscible organic solvent; (c) at least one non-ionic surfactant; and (d) a polyalkoxylated alkyl ether with proviso that the composition comprises ionic surfactant in amount of less than 2% by weight based on the total weight of the composition.

The present invention provides a stable, liquid composition comprising (a) an amount of a cyclohexanedione oxime compound; (b) a low water miscible organic solvent; (c) at least one non-ionic surfactant; and (d) a polyalkoxylated alkyl ether with proviso that the composition comprises ionic surfactant in amount of less than 2% by weight based on the total weight of the composition.

In some embodiments, cyclohexanedione oxime compound refers to neutral derivative, agriculturally acceptable salt or ester thereof.

In some embodiments, the cyclohexanedione oxime compound is clethodim.

Preferably, the stable liquid composition is free of ionic surfactant.

Preferably, the stable liquid composition is chemically and physically stable.

In some embodiments, the polyalkoxylated alkyl ether is polyalkoxylated butyl ether.

In some embodiments, the alkoxylated refers to polyalkylene oxide.

Polyalkylene oxides may include but are not limited to ethylene oxide, propylene oxide and butylene oxide.

In some embodiments, the alkyl alkoxylated ether comprises a short alkyl chain, such as a methyl, ethyl, propyl or butyl group. In some embodiments, the alkyl alkoxylated ether comprises a long alkyl chain such as fatty alcohol, including unsaturated and/or branched fatty alcohol.

In some embodiments, the alkyl alkoxylated ether is open/free hydroxyl ether. In some embodiments, the alkyl alkoxylated ether is an end cap ether. In some embodiments, alkyl refers to short chain. Short chain refers to C1-C10. Examples of alkyl are methyl or ethyl groups. In some embodiments, alkyl refers to the long chain. Long chain refers to C10-C30. In some embodiments, the chain is saturated. In some embodiments, the alkyl is unsaturated. In some embodiments, the alkyl is branched.

End cap refers to a terminal hydroxyl group of certain alkyl alkoxylated ethers of the invention which are capped by an alkyl group, such a methyl, ethyl, benzyl or the like.

Polyalkoxylated alkyl ether refers to polymers and copolymers. Copolymer refers to block co-polymers and/or random co-polymers.

In some embodiments, alkoxy group refers but is not limited to ethylene oxide, propylene oxide, butylene oxide or combinations thereof.

Examples of a polyalkoxylated alkyl ether are ethoxypropoxy butyl ethers such as Ethylan™ NS 500 LQ, Synergen SOC and Brij™ IC20.

Polyalkoxylated alkyl ethers may include but are not limited to alkoxylated alcohols (such as n-butyl alcohol poly glycol ether), random copolymers (such as ethylene oxide-propylene oxide block copolymers and ethylene oxide-butylene oxide block copolymers) block copolymers (such as ethylene oxide-propylene oxide block copolymers and ethylene oxide-butylene oxide block copolymers); or alkyl end capped alkoxylate ethers or combinations thereof.

In some embodiments, non-ionic surfactant refers but is not limited to sugar based surfactant, triblock co-polymer, polypolyalkoxylated plant oil and polyalkoxylated polyaryl ethers.

In some embodiments, non-ionic surfactant refers but is not limited to sugar based surfactant, triblock co-polymer, polypolyalkoxylated plant oil, polyalkoxylated polyaryl ethers and polyalkoxylated alkyl ether.

In some embodiments, the tri block copolymer refers to co polymer of poly fatty acid and poly polyalkylene oxide.

In In some embodiments, the tri block copolymer refers to co polymer of poly fatty acid and poly polyalkylene oxide.

In some embodiments, the tri block copolymer of poly fatty acid and poly polyalkylene oxide is a block copolymer of polyethylene glycol and 12-hydroxystearic acid.

In some embodiments, the block copolymer of polyethylene glycol and 12-hydroxystearic acid is Atlox™ 4912.

In some embodiments, polyalkoxylated plant oil is selected from a group consisting of olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, and tall oil.

In some embodiments, the fatty acid in the polyalkoxylated sorbitan fatty acid ester is C10-C20.

In some embodiments, the polyalkoxylated sorbitan fatty acid ester is Polysorbate 80 (CAS No. 9005-65-6).

In some embodiments, the polyoxyalkylene polyaryl ether is ethoxylated tristyrylphenol ether.

In some embodiments, the polyoxyalkylene polyaryl ether is a polyoxyalkylene tristyryl phenyl ether. In some embodiments the polyoxyalkylene tristyryl phenyl ether is polyoxyethylene tristyryl phenyl ether. In some embodiments, the polyoxyalkylene tristyryl phenyl ether is polyoxyethylene polyoxypropylene tristyryl phenyl ether.

In some embodiments, the ethoxylated tristyrylphenol is Soprophor BSU.

In some embodiments, the polyalkoxylated plant oil derivative is ethoxylated castor oil.

In some embodiments, the ethoxylated castor oil is Emulsogen EL 360.

In some embodiments, the alkoxylated refers to polyalkylene oxide.

Polyalkylene oxides may include but are not limited to ethylene oxide, propylene oxide and butylene oxide.

In some embodiments, the at least two non-ionic surfactants comprise at least one non-ionic surfactant selected from sugar based surfactant and triblock co-polymer and at least one non-ionic surfactant is selected from polypolyalkoxylated plant oil and polyalkoxylated polyaryl ethers.

In some embodiments, sugar based surfactant is polyalkoxylated sorbitan fatty acid esters.

In some embodiments, triblock copolymer is tri block copolymers of poly fatty acid and poly polyalkylene oxide.

In some embodiments, the polyalkoxylated plant oil is polyalkoxy castor oil.

In some embodiments, the polyalkoxylated polyaryl ethers is Soprophor BSU.

In some embodiments, at least one non-ionic surfactant is selected from a group consisting of sugar based surfactants and triblock co-polymers and at least one non-ionic surfactant is selected from polyalkoxylated plant oil and polyalkoxylated polyaryl ethers.

In some embodiments, at least one non-ionic surfactant is selected from a group consisting of polyalkoxylated sorbitan fatty acid esters and tri block copolymers of poly fatty acid and poly polyalkylene oxide.

In some embodiments, at least one non-ionic surfactant is selected from a group consisting of polyalkoxylated plant oil derivatives and polyalkoxylated polyaryl ethers.

In some embodiments, the tri block copolymer refers to co polymer of poly fatty acid and poly polyalkylene oxide.

In some embodiments, the tri block copolymer of poly fatty acid and poly polyalkylene oxide is a block copolymer of polyethylene glycol and 12-hydroxystearic acid.

In some embodiments, the block copolymer of polyethylene glycol and 12-hydroxystearic acid is Atlox™ 4912.

In some embodiments, polyalkoxylated plant oil is selected from a group consisting of olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, and tall oil.

In some embodiments, the fatty acid in the polyalkoxylated sorbitan fatty acid ester is C10-C20.

In some embodiments, the polyalkoxylated sorbitan fatty acid ester is Polysorbate 80 (CAS No. 9005-65-6).

In some embodiments, the polyoxyalkylene polyaryl ether is ethoxylated tristyrylphenol ether.

In some embodiments, the polyoxyalkylene polyaryl ether is a polyoxyalkylene tristyryl phenyl ether. In some embodiments the polyoxyalkylene tristyryl phenyl ether is polyoxyethylene tristyryl phenyl ether. In some embodiments, the polyoxyalkylene tristyryl phenyl ether is polyoxyethylene polyoxypropylene tristyryl phenyl ether.

In some embodiments, the ethoxylated tristyrylphenol is Soprophor BSU.

In some embodiments, the polyalkoxylated plant oil derivative is ethoxylated castor oil.

In some embodiments, the ethoxylated castor oil is Emulsogen EL 360.

In some embodiments, the alkoxylated refers to polyalkylene oxide.

Polyalkylene oxides may include but are not limited to ethylene oxide, propylene oxide and butylene oxide.

The present invention provides a stable, liquid composition comprising (a) an effective amount of a cyclohexanedione oxime compound; b) a low water miscible organic solvent; and (c) a stabilizing system comprising at least two non-ionic surfactants and wherein the composition is substantially free of ionic surfactant.

In some embodiments, cyclohexanedione oxime compound refers to neutral derivative, agriculturally acceptable salt or ester thereof.

In some embodiments, the cyclohexanedione oxime compound is clethodim.

Preferably, the stable liquid composition is free of ionic surfactant.

Preferably, the stable liquid composition is chemically and physically stable.

In some embodiments, the stabilizing system comprises at least one non-ionic surfactant selected from sugar based surfactants and triblock co-polymers and (2) at least one non-ionic surfactant is selected from polyalkoxylated plant oil and polyalkoxylated polyaryl ethers.

In some embodiments, sugar based surfactant is polyalkoxylated sorbitan fatty acid esters.

In some embodiments, triblock copolymer is tri block copolymers of poly fatty acid and poly polyalkylene oxide.

In some embodiments, the polyalkoxylated plant oil is polyalkoxy castor oil.

In some embodiments, the polyalkoxylated polyaryl ethers is Soprophor® BSU.

In some embodiments, the non-ionic surfactant is selected from a group consisting of sugar based surfactants and triblock co-polymers and at least one non-ionic surfactant is selected from polyalkoxylated plant oil and polyalkoxylated polyaryl ethers.

In some embodiments, at least one non-ionic surfactant is selected from a group consisting of polyalkoxylated sorbitan fatty acid esters and tri block copolymers of poly fatty acid and poly polyalkylene oxide.

In some embodiments, at least one non-ionic surfactant is selected from a group consisting of polyalkoxylated plant oil derivatives and polyalkoxylated polyaryl ethers.

In some embodiments, the tri block copolymer refers to co polymer of poly fatty acid and poly polyalkylene oxide.

In some embodiments, the tri block copolymer of poly fatty acid and poly polyalkylene oxide is a block copolymer of polyethylene glycol and 12-hydroxystearic acid.

In some embodiments, the block copolymer of polyethylene glycol and 12-hydroxystearic acid is Atlox™ 4912.

In some embodiments, polyalkoxylated plant oil is selected from a group consisting of olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, and tall oil.

In some embodiments, the fatty acid in the polyalkoxylated sorbitan fatty acid ester is C10-C20.

In some embodiments, the polyalkoxylated sorbitan fatty acid ester is Polysorbate 80 (CAS No. 9005-65-6).

In some embodiments, the polyoxyalkylene polyaryl ether is ethoxylated tristyrylphenol ether.

In some embodiments, the polyoxyalkylene polyaryl ether is a polyoxyalkylene tristyryl phenyl ether. In some embodiments the polyoxyalkylene tristyryl phenyl ether is polyoxyethylene tristyryl phenyl ether. In some embodiments, the polyoxyalkylene tristyryl phenyl ether is polyoxyethylene polyoxypropylene tristyryl phenyl ether.

In some embodiments, the ethoxylated tristyrylphenol is Soprophor BSU.

In some embodiments, the polyalkoxylated plant oil derivative is ethoxylated castor oil.

In some embodiments, the ethoxylated castor oil is Emulsogen® EL 360.

In some embodiments, the alkoxylated refers to polyalkylene oxide.

Polyalkylene oxides may include but are not limited to ethylene oxide, propylene oxide and butylene oxide.

The present invention provides a stable, liquid composition comprising (a) an effective amount of a cyclohexanedione oxime compound; (b) a low water miscible organic solvent; and (c) at least one non-ionic surfactant and (d) polyalkoxylated alkyl ether; wherein the composition is substantially free of ionic surfactant.

The present invention provides a stable, liquid composition comprising (a) an amount of a cyclohexanedione oxime compound; (b) a low water miscible organic solvent; and (c) at least one non-ionic surfactant and (d) polyalkoxylated alkyl ether; wherein the composition is substantially free of ionic surfactant.

The present invention provides a stable, liquid composition comprising (a) an effective amount of a cyclohexanedione oxime compound; (b) a low water miscible organic solvent; and (c) at least two non-ionic surfactants; wherein the composition is substantially free of ionic surfactant.

The present invention provides a stable, liquid composition comprising (a) an amount of a cyclohexanedione oxime compound; (b) a low water miscible organic solvent; and (c) at least two non-ionic surfactants; wherein the composition is substantially free of ionic surfactant.

In some embodiments, non-ionic surfactant refers but is not limited to sugar based surfactant, triblock co-polymer, polypolyalkoxylated plant oil and polyalkoxylated polyaryl ethers.

In some embodiments, the at least two non-ionic surfactants comprise at least one non-ionic surfactant selected from sugar based surfactant and triblock co-polymer and at least one non-ionic surfactant is selected from polypolyalkoxylated plant oil and polyalkoxylated polyaryl ethers.

In some embodiments, the composition further comprises a third non-ionic surfactant.

In some embodiments, a third non-ionic surfactant may include but is not limited to polyalkoxylated alkyl ether.

The present invention provides a stable, liquid composition comprising an effective amount of a) a cyclohexanedione oxime compound; (b) a low water miscible organic solvent; (c) at least one non-ionic surfactant selected from a group consisting of polyalkoxylated sorbitan fatty acid esters and tri block copolymers of poly fatty acid and poly polyalkylene oxide and (d) at least one non-ionic surfactant selected from a group consisting of polyalkoxylated plant oil derivatives and polyalkoxylated polyaryl ethers, wherein the composition is substantially free of ionic surfactant.

The present invention provides a stable liquid composition comprising an effective amount of a) a cyclohexanedione oxime compound; (b) a low water solubility organic solvent; (c) polyalkoxylated sorbitan fatty acid ester and (d) polyalkoxylated plant oil derivative wherein the composition is substantially free of ionic surfactant.

In some embodiments, the composition further comprises polyalkoxylated alkyl ether.

The present invention provides a stable liquid composition comprising an effective amount of a) a cyclohexanedione oxime compound; (b) a low water solubility organic solvent; (c) polyalkoxylated sorbitan fatty acid ester; (d) polyalkoxylated plant oil derivative and polyalkoxylated alkyl ether; wherein the composition is substantially free of ionic surfactant.

The present invention provides a stable liquid composition comprising an effective amount of a) a cyclohexanedione oxime compound; (b) a low water solubility organic solvent; (c) tri block copolymer of poly fatty acid and poly polyalkylene oxide and (d) polyalkoxylated plant oil derivative wherein the composition is substantially free of ionic surfactant.

The present invention provides a stable liquid composition comprising an effective amount of a) a cyclohexanedione oxime compound; (b) a low water solubility organic solvent; (c) tri block copolymer of poly fatty acid and poly polyalkylene oxide and (d) polyalkoxylated polyaryl ether, wherein the composition is substantially free of ionic surfactant.

The present invention provides a stable liquid composition comprising an effective amount of a) a cyclohexanedione oxime compound; (b) a low water solubility organic solvent; (c) polyalkoxylated sorbitan fatty acid ester and (d) alkoxylated plant oil, wherein the composition is substantially free of ionic surfactant.

In some embodiments, the composition further comprises polyalkoxylated alkyl ether.

The two non-ionic surfactants are complementary to each other in order to stabilize the soluble cyclohexanedione oxime compound in a low water solubility organic solvent after dilution with water.

The two non-ionic surfactants are complementary to each other in order to stabilize the cyclohexanedione oxime compound in oil in water composition.

In some embodiments, the oil in water composition is obtained prior to application to the plant.

In some embodiments, the oil in water composition is the concentrated composition.

In some embodiments, the cyclohexanedione oxime compound is clethodim.

In some embodiments, the tri block copolymer refers to co polymer of poly fatty acid and poly polyalkylene oxide.

In some embodiments, the tri block copolymer of poly fatty acid and poly polyalkylene oxide is a block copolymer of polyethylene glycol and 12-hydroxystearic acid.

In some embodiments, the block copolymer of polyethylene glycol and 12-hydroxystearic acid is Atlox™ 4912.

In some embodiments, polyalkoxylated plant oil is selected from a group consisting of olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, and tall oil.

In some embodiments, the fatty acid in the polyalkoxylated sorbitan fatty acid ester is C10-C20.

In some embodiments, the polyalkoxylated sorbitan fatty acid ester is Polysorbate 80 (CAS No. 9005-65-6).

In some embodiments, the polyoxyalkylene polyaryl ether is ethoxylated tristyrylphenol ether.

In some embodiments, the polyoxyalkylene polyaryl ether is a polyoxyalkylene tristyryl phenyl ether. In some embodiments the polyoxyalkylene tristyryl phenyl ether is polyoxyethylene tristyryl phenyl ether. In some embodiments, the polyoxyalkylene tristyryl phenyl ether is polyoxyethylene polyoxypropylene tristyryl phenyl ether.

In some embodiments, the ethoxylated tristyrylphenol is Soprophor® BSU.

In some embodiments, the polyalkoxylated plant oil derivative is ethoxylated castor oil.

In some embodiments, the ethoxylated castor oil is Emulsogen® EL 360.

In some embodiments, the alkoxylated refers to polyalkylene oxide.

Polyalkylene oxides may include but are not limited to ethylene oxide, propylene oxide and butylene oxide.

In some embodiments, the amount of the two non-ionic surfactants in the composition is in the range of between 1% to 20% by weight based on the total weight of the composition. In some embodiments, the amount of the two non-ionic surfactants in the composition is in the range of between 2% to 10% by weight based on the total weight of the composition. In some embodiments, the amount of the two non-ionic surfactants in the composition is in the range of between 3% to 7% by weight based on the total weight of the composition.

In some embodiments, the composition comprises from about 1% to about 20% by weight of non-ionic surfactant(s) based on the total weight of the composition. In some embodiments, the composition comprises from about 1% to about 15% by weight of non-ionic surfactant(s) based on the total weight of the composition. In some embodiments, the composition comprises from about 1% to about 10% by weight of non-ionic surfactant(s) based on the total weight of the composition. In some embodiments, the composition comprises from about 5% to about 10% by weight of non-ionic surfactant(s) based on the total weight of the composition. In some embodiments, the composition comprises about 5% by weight of non-ionic surfactant(s) based on the total weight of the composition. In some embodiments, the composition comprises about 6% by weight of non-ionic surfactant(s) based on the total weight of the composition. In some embodiments, the composition comprises about 7% by weight of non-ionic surfactant(s) based on the total weight of the composition. In some embodiments, the composition comprises about 8% by weight of non-ionic surfactant(s) based on the total weight of the composition. In some embodiments, the composition comprises about 9% by weight of non-ionic surfactant(s) based on the total weight of the composition. In some embodiments, the composition comprises about 10% by weight of non-ionic surfactant(s) based on the total weight of the composition.

In some embodiments the weight ratio between the two non-ionic surfactants is from 9:1 to 1:9, In some embodiments, weight ratio between the two non-ionic surfactants is 7:3, In some embodiments, weight ratio between the two non-ionic surfactants is 6:4, preferably, the weight ratio between the two non-ionic surfactants is 1:1.

In some embodiments the weight ratio between the two non-ionic surfactants is from 9:1 to 1:9. In some embodiments, weight ratio between the two non-ionic surfactants is 7:3. In some embodiments, weight ratio between the two non-ionic surfactants is 6:4, preferably, the weight ratio between the two non-ionic surfactants is 1:1.

In some embodiments, the amount of the two non-ionic surfactants is in the ranges from 0.5 to 10% by weight based on the total weight of the composition.

In some embodiments the amount of the third non-ionic surfactant ranges from 1 to 5% by weight based on the total weight of the composition.

In some embodiments, the amount of stabilizing system in the composition ranges from about 1% to about 20% by weight based on the total weight of the composition.

In some embodiments, the amount of the stabilizing system in the composition ranges from about 3% to about 20% by weight based on the total weight of the composition.

In some embodiments, the amount of the non-ionic surfactants in the composition is in the range of between 1% to 20% by weight based on the total weight of the composition. In some embodiments, the amount of the two non-ionic surfactants in the composition is in the range of between 2% to 10% by weight based on the total weight of the composition. In some embodiments, the amount of the two non-ionic surfactants in the composition is in the range of between 3% to 7% by weight based on the total weight of the composition.

In some embodiments, the tri block copolymer of poly fatty acid and poly polyalkylene oxide A-B-A triblock comprises two polyhydroxy stearates and one poly ethylene oxide.

In some embodiments, the tri block copolymer of poly fatty acid and poly polyalkylene oxide is Atlox™ 4912.

In some embodiments, the two non-ionic surfactants are Atlox™ 4912 and Soprophor®.

In some embodiments, the two non-ionic surfactants are Atlox™ 4912 and ethoxylated castor oil.

In some embodiments the two non-ionic surfactants are polyalkoxylated sorbitan fatty acid ester and alkoxylated castor oil.

In some embodiments, the composition further comprises polyalkoxylated alkyl ether.

The stabilization of oil in water is affected by the water intermolecular interactions of the surfactant and the water molecules, to obtain a fully and uniform isolation from the water.

The stabilization of low water miscible organic solvent in water is affected by the ability of the surfactants to cover and pack the separate phases and interact with the different phases.

It was found that stabilization of the low water miscible organic solvent comprising clethodim in water is dependent on the arrangement and interaction of the hydrophilic and lipophilic groups of the surfactant over and with the organic and water carriers and less dependent on the level of hydrophilicity or lipophilicity (HLB values) of each surfactant. It was found that compositions comprising cyclohexanedione oxime compound can be stabilized with broad range of HLB.

It was found that a composition comprising cyclohexanedione oxime compound can be stabilized with a broad range of HLB. The level of hydrophilicity or lipophilicity affects the stability of the emulsion less than the structure and location of the hydrophilic groups over the oil surface.

In some embodiments, the non-ionic surfactants have low HLB value.

In some embodiments, the non-ionic surfactants have a high HLB value. In some embodiments, the two non-ionic surfactants in the composition have both high and low HLB values.

High HLB value refers but is not limited to a range of between 12 to 16.

Low HLB value refers but is not limited to a range of between 3 to 6.

In some embodiments, the non-ionic surfactants have low HLB between 3 to 6. In some embodiments the non-ionic surfactants have a high HLB value, between 12 to 16.

In some embodiments, the non-ionic surfactants have a medium HLB value, between 6 to 12.

It was also found that compositions of the present invention which are substantially free of ionic surfactant and comprise the combination of at least two non-ionic surfactants are less affected by water residue and the composition may contain water up to 1.5% by weight based on the total weight of the composition.

Reducing moisture sensitivity is important for the manufacturing process, packaging and self-life.

In some embodiments, the composition comprises water in amounts of less than 1.5% by weight based on the total weight of the stable composition.

Physical stability of composition is tested by CIPAC methodologies (e.g. MT 36.3)

The test is standard in the relevant industry before and after the storage stability test (2 weeks at 54° C. or equivalent—after 8 weeks at 40° C.).

Chemical stability of the composition is tested by HPLC analysis.

In some embodiments, stability of the clethodim refers to less than 6%, 5%, 4%, 3%, or 2% degradation.

Normal storage condition is two years storage at room temperature or under an accelerated storage stability test: after 2 weeks at 54° C. or equivalent—after 8 weeks at 40° C. or after 12 weeks at 35° C.

In some embodiments, the non-ionic surfactant does not include reactively hydroxyl groups.

In some embodiments, the non-ionic surfactant includes a non-reactively hydroxyl groups.

Reactively hydroxyl groups are groups with bond dissociation energies less than 120 Kcal/mol.

In some embodiments, the surfactant does not include a weak dissociate hydrogen bond.

In some embodiments, the surfactant does not include an acidic functional group.

Acidic functional group may include but is not limited to carboxylic acid, sulfonic acid and hydrogen bond having bond dissociation energies less than 120 Kcal/mol.

Alcohol refers to acidic alcohol having bond dissociation energies less than 120 Kcal/mol.

In some embodiments, the stable liquid composition is substantially free of ionic surfactant.

In some embodiments, the stable liquid composition is free of anionic surfactant.

In some embodiments, the stable liquid composition is chemically stable. In some embodiments, the stable liquid composition is physically stable.

In some embodiments, the stable composition comprises at least one non-ionic surfactant.

In some embodiments, the stable composition comprises a mixture of at least two non-ionic surfactants.

The two non-ionic surfactants are selected from groups I and II.

Group I includes but is not limited to polyalkoxylated sorbitan fatty acid esters and tri block copolymers of poly fatty acid and poly polyalkylene oxide.

Group II includes but is not limited to polyalkoxylated plant oil derivatives and polyalkoxylated polyaryl ethers.

In preferred embodiments, the non-ionic surfactants include polyalkoxylated plant oil and alkoxylated polysorbates.

In preferred embodiments, the non-ionic surfactants include polyalkoxylated plant oil and block copolymer having the structure A-B-A.

A-B-A refers but is not limited to block copolymer of polyethylene glycol and 12-hydroxystearic acid such as Atlox™ 4912.

In preferred embodiments plant oil refers but is not limited to castor oil.

In some embodiments, non-ionic surfactants include but are not limited to ethoxylated and/or propoxylated sorbitan ester block copolymer having the structure ABA, and alkoxylated castor oil, block copolymers of ethylene oxide (EO) and propylene oxide (PO), alkylpolysaccharide, alkoxylated alkyl amine and alkylated amine.

In some embodiments, ethoxylated and/or propoxylated sorbitan fatty acid ester is polysorbate 80.

In some embodiments, the non-ionic surfactant is a mixture of polysorbate 80 and ethoxylated castor oil.

In some embodiments, the at least two non-ionic surfactants are commercial as Agnique BL 4524.

In some embodiments, the composition comprises ionic surfactants at concentrations of less than 0.3% by total weight of the stable composition. In some embodiments, the composition comprises ionic surfactants at concentrations of less than 0.2% by total weight of the stable composition.

Ionic surfactant may refer but is not limited to anionic, cationic, zwitterionic, poly electrolyte and combinations thereof.

In some embodiments, the composition comprises at least one chemical stabilizing agent. In some embodiments, the composition comprises at least two chemical stabilizing agents. In some embodiments, the composition comprises one chemical stabilizing agent. In some embodiments, the composition comprises two chemical stabilizing agents.

In some embodiments, the composition is free of chemical stabilizing agent.

In some embodiments, there is no need to add chemical stabilizing agent.

In some embodiments, chemical stabilizer is photo stabilizing agents.

In some embodiments, the composition is free of photo stabilizing agents.

In some embodiments, the composition further comprising at least one chemical stabilizing agent and at least one photo stabilizing agent.

In some embodiments, the composition further comprises a chemical stabilizing agent.

In some embodiments, chemical stabilizing agents include but are not limited to butylated hydroxytoluene; phenolic antioxidant; alkyl-hydroxy-benzophenones (parabens), alkyl-salicylates, thymol, propyl gallate, tert-butyl-hydro-quinone, titanium dioxide, hexamethyleneteramine, cysteine, ascorbic-acid, citric acid, tetraterpenoids (carotenoids), tocopherols, alkyl hydroxy anisoles, triethanolamine, sodium metabisulfite, epoxy methyl soyate (Epoxol®) and any combination thereof.

In some embodiments, chemical stabilizing agent is butylated hydroxytoluene. In some embodiment, the chemical stabilizing agent is a phenolic antioxidant. In some embodiment, the chemical stabilizing agent is an alkyl-hydroxy-benzophenone (paraben). In some embodiment, the chemical stabilizing agent is an alkyl-salicylate. In some embodiment, the chemical stabilizing agent is thymol. In some embodiment, the chemical stabilizing agent is propyl gallate. In some embodiment, the chemical stabilizing agent is tert-butyl-hydro-quinone. In some embodiment, the chemical stabilizing agent is titanium dioxide. In some embodiment, the chemical stabilizing agent is hexamethyleneteramine. In some embodiment, the chemical stabilizing agent is cysteine. In some embodiment, the chemical stabilizing agent is ascorbic-acid. In some embodiment, the chemical stabilizing agent is citric acid. In some embodiment, the chemical stabilizing agent is a tetraterpenoid (carotenoid). In some embodiment, the chemical stabilizing agent is a tocopherol. In some embodiment, the chemical stabilizing agent is an alkyl hydroxy anisole. In some embodiments, the alkyl hydroxy anisole is butylated hydroxyanisole. In some embodiment, the chemical stabilizing agent is triethanolamine. In some embodiment, the chemical stabilizing agent is sodium metabisulfite. In some embodiment, the chemical stabilizing agent is epoxy methyl soyate. In some embodiments, the epoxy methyl soyate is Epoxol®.

In some embodiments, the composition comprises from about 0.01% to about 5% by weight of the chemical stabilizing agent(s) based on the total weight of the composition. In some embodiments, the composition comprises from about 0.01% to about 2% by weight of the chemical stabilizing agent(s) based on the total weight of the composition. In some embodiments, the composition comprises from about 0.1% to about 1.5% by weight of the chemical stabilizing agent(s) based on the total weight of the composition. In some embodiments, the composition comprises about 0.1% by weight of the chemical stabilizing agent(s) based on the total weight of the composition. In some embodiments, the composition comprises about 0.2% by weight of the chemical stabilizing agent(s) based on the total weight of the composition. In some embodiments, the composition comprises about 0.2% by weight of the chemical stabilizing agent(s) based on the total weight of the composition. In some embodiments, the composition comprises about 0.5% by weight of the chemical stabilizing agent(s) based on the total weight of the composition. In some embodiments, the composition comprises about 0.8% by weight of the chemical stabilizing agent(s) based on the total weight of the composition. In some embodiments, the composition comprises about 1% by weight of the chemical stabilizing agent(s) based on the total weight of the composition. In some embodiments, the composition comprises about 1.2% by weight of the chemical stabilizing agent(s) based on the total weight of the composition. In some embodiments, the composition comprises about 1.4% by weight of the chemical stabilizing agent(s) based on the total weight of the composition.

In some embodiments, photo stabilizing agents include but are not limited to butylated hydroxytoluene; phenolic antioxidant; hydroxy-benzophenone, titanium dioxide.

In some embodiments the composition further comprises additive and/or adjuvant.

In some embodiments the water amount in the composition is equal to or less than 1.5%, or 1%, or 0.5%, or 0.2% by weight based on the total weight of the stable composition.

In some embodiments, the low water miscible organic solvent is a non-polar solvent. In some embodiments, the low water miscible organic solvent is an aromatic hydrocarbon. In some embodiments, the aromatic hydrocarbon is naphthalene solvent. In some embodiments, the aromatic hydrocarbon is Solvesso™. In some embodiments, the aromatic hydrocarbon is an alkyl-benzene solvent. In some embodiments, the alkyl-benzene solvent is Solvesso™. In some embodiments, the low water miscible organic solvent is an aromatic solvent. In some embodiments, the aromatic solvent is naphthalene solvent. In some embodiments, the aromatic solvent is Solvesso™. In some embodiments, the aromatic solvent is an alkyl-benzene solvent. In some embodiments, the alkyl-benzene solvent is Solvesso™. In some embodiments, the low water miscible organic solvent is a non-aromatic solvent. In some embodiments, non-aromatic solvent includes aprotic solvents.

In some embodiments, aprotic solvent includes but is not limited to hexane and cyclohexane.

In some embodiments, the low water solubility organic solvent is selected from a group consisting of aromatic hydrocarbons, paraffins, petroleum, diesel, mineral oil, and any combination thereof.

In some embodiments, the low water miscible organic solvent is an aromatic hydrocarbon. In some embodiments, the low water miscible organic solvent may include a combination of at least two solvents. In some embodiments, the low water miscible organic solvent may include a combination of aromatic hydrocarbon and one or more additional low water miscible organic solvent.

In some embodiments, the aromatic hydrocarbon is selected from a group consisting of toluene, o-xylene, m-xylene, p-xylene, ethylbenzene, isopropylbenzene, tert-butylbenzene, naphthalenes, and mono- or polyalkyl-substituted naphthalenes.

In some embodiments, the aromatic hydrocarbon is a C12 aromatic hydrocarbon. In some embodiments, the aromatic hydrocarbon is ultra-low naphthalene solvent (ULN). In some embodiments, the aromatic hydrocarbon is low naphthalene solvent (LN).

In some embodiments, the aromatic hydrocarbon is the Solvesso™ grades from ExxonMobil Chemical, especially Solvesso™ 100 (CAS No. 64742-95-6), Solvesso™ 150 (CAS No. 64742-94-5), and Solvesso™ 200 (CAS No. 64742-94-5). In some embodiments, the aromatic hydrocarbon is Caromax® 28 LN.

In some embodiments, the low water solubility organic solvent is a paraffin. In some embodiments, the paraffin is selected from a group consisting of octane, nonane, decane, undecane, dodecane, tridecane, tetradecane, pentadecane, hexadecane, hepta-decane, octa-decane, nona-decane, eicosane, heneicosane, docosane, tricosane, tetracosane, pentacosane, and branched chain isomers thereof.

In some embodiments, the composition comprises from about 10% to about 80% by weight of the low water solubility organic solvent based on the total weight of the composition. In some embodiments, the composition comprises from about 20% to about 70% by weight of the low water solubility organic solvent based on the total weight of the composition. In some embodiments, the composition comprises from about 30% to about 60% by weight of the low water solubility organic solvent based on the total weight of the composition. In some embodiments, the composition comprises from about 40% to about 50% by weight of the low water solubility organic solvent based on the total weight of the composition. In some embodiments, the composition comprises about 40% by weight of the low water solubility organic solvent based on the total weight of the composition. In some embodiments, the composition comprises about 45% by weight of the low water solubility organic solvent based on the total weight of the composition. In some embodiments, the composition comprises about 50% by weight of the low water solubility organic solvent based on the total weight of the composition. In some embodiments, the composition comprises about 55% by weight of the low water solubility organic solvent based on the total weight of the composition.

In some embodiments, the low water miscible organic solvent contains water less than or equal to 1.5%, or 1%, or 0.7%, or 0.5%, or 0.2% or 0.1%.

In some embodiments, the low water miscible organic solvent is liquid which absorbed water less than or equal to 1.0%, or 1%, or 0.7%, or 0.5%, or 0.2% or 0.1%.

In some embodiments, the low water miscible organic solvent is liquid which absorbed water less than or equal to 1 mg per 100 ml, or 0.5 mg per 100 ml.

In some embodiments, the stable composition contains water less than or equal to 1.5%, or 1%, or 0.7%, or 0.5%, or 0.2% or 0.1%.

In some embodiments, the stable composition contains water less than or equal to 1 g per liter, or 0.5 gr per liter.

In some embodiments, the stable composition is liquid which absorbed water less than or equal to 1.0%, or 0.7%, or 0.5%, or 0.2% or 0.1%.

In some embodiments, the solvent has a dielectric constant of less than 10.

In some embodiments, the non-ionic surfactant has a stable OH group as an end group.

In some embodiments, the stable liquid composition is emulsifiable concentrate, oil in water emulsion or water in oil emulsion.

In some embodiments, the amount of the cyclohexanedione oxime compound is 0.1-80% by weight based on the total weight of the stable composition. In some embodiments, the amount of the cyclohexanedione oxime compound is 0.1-70% by weight based on the total weight of the stable composition. In some embodiments, the amount of the cyclohexanedione oxime compound is 1-60% by weight based on the total weight of the stable composition. In some embodiments, the amount of the cyclohexanedione oxime compound is 5-50% by weight based on the total weight of the stable composition.

In some embodiments, the amount of the cyclohexanedione oxime compound is 10-20% by weight based on the total weight of the stable composition. In some embodiments, the amount of the cyclohexanedione oxime compound is 1-15% by weight based on the total weight of the stable composition. In some embodiments, the amount of the cyclohexanedione oxime compound is about 14% by weight based on the total weight of the stable composition.

In some embodiments, the amount of the cyclohexanedione oxime compound is 20-30% by weight based on the total weight of the stable composition. In some embodiments, the amount of the cyclohexanedione oxime compound is about 24% by weight based on the total weight of the stable composition.

In some embodiments, the amount of the cyclohexanedione oxime compound is 40-50% by weight based on the total weight of the stable composition. In some embodiments, the amount of the cyclohexanedione oxime compound is about 45% by weight based on the total weight of the stable composition.

In some embodiments, the amount of the cyclohexanedione oxime herbicide is 0.1-80% by weight based on the total weight of the stable composition. In some embodiments, the amount of the cyclohexanedione oxime herbicide is 0.1-70% by weight based on the total weight of the stable composition. In some embodiments, the amount of the cyclohexanedione oxime herbicide is 0.1-60% by weight based on the total weight of the stable composition. In some embodiments, the amount of the cyclohexanedione oxime herbicide is 0.1-40% by weight based on the total weight of the stable composition. In some embodiments, the amount of the Cyclohexanedione oxime herbicide is 0.1-25% by weight based on the total weight of the stable composition. In some embodiments, the amount of the cyclohexanedione oxime herbicide is 0.1-1% by weight based on the total weight of the stable composition. In a specific embodiment, the amount of the cyclohexanedione oxime herbicide is about 0.5% by weight based on the total weight of the stable composition.

In some embodiments, the concentration of the cyclohexanedione oxime in the stable composition is between 1 to 50 g/L. In some embodiments, the concentration of the Cyclohexanedione oxime in the stable composition is between 1 to 25 g/L. In some embodiments, the concentration of the cyclohexanedione oxime in the stable composition is between 1 to 10 g/L. In some embodiments, the concentration of the cyclohexanedione oxime in the stable composition is about 5 g/L.

In some embodiments, the amount of the clethodim is 0.1-80% by weight based on the total weight of the stable composition. In some embodiments, the amount of the clethodim is 0.1-70% by weight based on the total weight of the stable composition. In some embodiments, the amount of the clethodim is 1-60% by weight based on the total weight of the stable composition. In some embodiments, the amount of clethodim is 5-50% by weight based on the total weight of the stable composition.

In some embodiments, the amount of clethodim is 1-15% by weight based on the total weight of the stable composition. In some embodiments, the amount of clethodim is 10-20% by weight based on the total weight of the stable composition. In some embodiments, the amount of clethodim is about 14% by weight based on the total weight of the stable composition.

In some embodiments, the amount of clethodim is 20-30% by weight based on the total weight of the stable composition. In some embodiments, the amount of clethodim is about 24% by weight based on the total weight of the stable composition.

In some embodiments, the amount of clethodim is 40-50% by weight based on the total weight of the stable composition. In some embodiments, the amount of clethodim is about 45% by weight based on the total weight of the stable composition.

In some embodiments, the concentration of the clethodim in the stable composition is between 50 to 500 g/L. In some embodiments, the concentration of the clethodim in the stable composition is between 50 to 300 g/L In some embodiments, the concentration of the clethodim in the stable composition is between 100 to 200 g/L. In some embodiments, the concentration of the clethodim in the stable composition is between 100 to 150 g/L. In some embodiments, the concentration of the clethodim in the stable composition is about 140 g/L. In some embodiments, the concentration of the clethodim in the stable composition is about 240 g/L. In some embodiments, the concentration of the clethodim in the stable composition is about 360 g/L. In some embodiments, the concentration of the clethodim in the stable composition is about 400 g/L. In some embodiments, the concentration of the clethodim in the stable composition is about 430 g/L.

In some embodiments, the composition further comprises at least one additionally pesticide. In some embodiments, the pesticide is an herbicide.

In some embodiments, the composition further comprises additionally at least one herbicide.

In some embodiments, the stable composition comprising cyclohexanedione oxime is a binary mixture. In some embodiments, the stable composition comprising cyclohexanedione oxime is a ternary mixture.

Herbicide may include but are not limited to fluroxypyr, 2-4D, saflufenacil, picloram, ammonium glufosinate and dicamba.

In some embodiments, the fluroxypyr is fluroxypyr ester.

In some embodiments, the fluroxypyr is fluroxypyr alkyl ester.

In some embodiments, the fluroxypyr is fluroxypyr-meptyl ester.

In some embodiments, the herbicide is fluroxypyr. In some embodiments, the herbicide is fluroxypyr-meptyl ester.

In some embodiments, the amount of the fluroxypyr and the clethodim is 0.1-90% by weight based on the total weight of the stable composition. In some embodiments, the amount of the fluroxypyr and the clethodim is 0.5-30% by weight based on the total weight of the stable composition. In some embodiments, the amount of the fluroxypyr and the clethodim is 1-15% by weight based on the total weight of the stable composition. In some embodiments, the amount of the fluroxypyr and the clethodim is 1-10% by weight based on the total weight of the stable composition. In some embodiments, the amount of the fluroxypyr and the clethodim is 3-8% by weight based on the total weight of the stable composition. In some embodiments, the amount of the fluroxypyr and the clethodim is about 15% by weight based on the total weight of the stable composition.

In some embodiments, the concentration of the fluroxypyr and the clethodim in the stable composition is between 50 to 500 g/L. In some embodiments, the concentration of the Fluroxypyr and the clethodim in the stable composition is between 50 to 300 g/L. In some embodiments, the concentration of the fluroxypyr and the clethodim in the stable composition is between 100 to 200 g/L. In some embodiments, the concentration of the fluroxypyr and the clethodim in the stable composition is between 100 to 150 g/L. In some embodiments, the concentration of the fluroxypyr and the clethodim in the stable composition is about 132 g/L.

In some embodiments, the amount of the fluroxypyr-meptyl ester and the clethodim is 0.1-90% by weight based on the total weight of the stable composition. In some embodiments, the amount of the fluroxypyr-meptyl ester and the clethodim is 0.5-30% by weight based on the total weight of the stable composition. In some embodiments, the amount of the fluroxypyr-meptyl ester and the clethodim is 1-15% by weight based on the total weight of the stable composition. In some embodiments, the amount of the fluroxypyr-meptyl ester and the clethodim is 1-10% by weight based on the total weight of the stable composition. In some embodiments, the amount of the fluroxypyr-meptyl ester and the clethodim is 3-8% by weight based on the total weight of the stable composition. In some embodiments, the amount of the fluroxypyr-meptyl ester and the clethodim is about 15% by weight based on the total weight of the stable composition.

In some embodiments, the concentration of the fluroxypyr-meptyl ester and the clethodim in the stable composition is between 50 to 500 g/L. In some embodiments, the concentration of the fluroxypyr-meptyl ester and the clethodim in the stable composition is between 50 to 300 g/L. In some embodiments, the concentration of the fluroxypyr-meptyl ester and the clethodim in the stable composition is between 100 to 200 g/L. In some embodiments, the concentration of the fluroxypyr-meptyl ester and the clethodim in the stable composition is between 100 to 150 g/L. In some embodiments, the concentration of the fluroxypyr-meptyl ester and the clethodim in the stable composition is about 132 g/L.

In some embodiments, wherein the composition comprising additional herbicide(s), the type and amount of the additional herbicide may affect the hydrophilicity/lipophilicity level of the composition and the hydrophilicity/lipophilicity level of the composition need to be adjusted.

In some embodiments, the hydrophilicity/lipophilicity level of the composition is adjusted by adding additional non-ionic surfactant(s), using non-ionic surfactants with different HLB, and/or changing the concentration ratio between the surfactants in the composition.

In some embodiments, the hydrophilicity/lipophilicity level of the composition is adjusted by adding additional polymeric non-ionic surfactant.

In some embodiments, the at least two polymeric non-ionic surfactants are used.

In some embodiments, the at least two polymeric non-ionic surfactants are used to enlarge the range of the hydrophilicity/lipophilicity level of the composition.

In some embodiments, the additional herbicide(s) has a low HLB and the composition comprises at least one high HLB non-ionic surfactant. In some embodiments, the additional herbicide(s) has a low HLB and the composition comprises at least two high HLB non-ionic surfactants. In some embodiments, the additional herbicide(s) has a low HLB and none of the non-ionic surfactants in the composition has a high HLB.

In some embodiments, the high HLB non-ionic surfactant has an HLB of higher than 10. In some embodiments, the high HLB non-ionic surfactant has an HLB of higher than 11.

In some embodiments, the high HLB non-ionic surfactant has an HLB of higher than 12. In some embodiments, the high HLB non-ionic surfactant has an HLB of higher than 13.

In some embodiments, the additional herbicide is fluroxypyr is fluroxypyr-meptyl ester.

In some embodiments, the composition is mixed with water prior to application. In some embodiments, the composition is mixed with water to form an emulsion prior to application. In some embodiments, the emulsion is stable.

In some embodiments, the composition comprises an additional pesticide and the additional pesticide is amphiphilic. In some embodiments, the amphiphilic pesticide is fluroxypyr-meptyl ester. In some embodiments, wherein the composition comprises an additional amphiphilic pesticide, the composition comprises at least one non-ionic surfactant having an HLB of greater than 9, greater than 10, greater than 11, greater than 12, greater than 12, or greater than 14. In some embodiments, wherein the composition comprises an additional amphiphilic pesticide, the composition comprises at least two non-ionic surfactants each having an HLB of greater than 9, greater than 10, greater than 11, greater than 12, greater than 12, or greater than 14. In some embodiments, wherein the composition comprises an additional amphiphilic pesticide, the composition comprises at least three non-ionic surfactants each having an HLB of greater than 9, greater than 10, greater than 11, greater than 12, greater than 12, or greater than 14.

In some embodiments, the amount of the low water miscible organic is 10-90% by weight based on the total weight of the stable composition. In some embodiments, the amount of the low water miscible organic solvent is 40-80% by weight based on the total weight of the stable composition. In some embodiments, the amount of the low water miscible organic solvent is 50-60% by weight based on the total weight of the stable composition. In some embodiments, the amount of the low water miscible organic solvent is 15-50% by weight based on the total weight of the stable composition. In some embodiments, the amount of the low water miscible organic solvent is 20-40% by weight based on the total weight of the stable composition. In some embodiments, the amount of the low water miscible organic solvent is 25-40% by weight based on the total weight of the stable composition. In some embodiments, the amount of the low water miscible organic solvent is 34% by weight based on the total weight of the stable composition.

In some embodiments, the concentration of the low water miscible organic solvent in the stable composition is 300-900 g/L. In some embodiments, the concentration of the low water miscible organic solvent in the stable composition is 400-700 g/L. In some embodiments, the concentration of the low water miscible organic solvent in the stable composition is 500-600 g/L. In some embodiments, the concentration of the low water miscible organic solvent in the stable composition is 575-600 g/L.

In some embodiments, the composition comprises at least an additional surfactant.

Surfactants may include but are not limited to ethoxylated castor oil, polyethoxylated sorbitan, alkoxylated alkyl amine and alkylated amine.

In some embodiments, the amount of surfactants present in the stable composition is between 0.1-40% by weight based on the total weight of the stable composition. In some embodiments, the amount of surfactants present in the stable composition is between 0.1-35% by weight based on the total weight of the stable composition. In some embodiments, the amount of surfactants present in the stable composition is between 0.1-30% by weight based on the total weight of the stable composition. In some embodiments, the amount of surfactants present in the stable composition is between 1-20% by weight based on the total weight of the stable composition. In some embodiments, the amount of surfactants present in the stable composition is between 5-10% by weight based on the total weight of the stable composition. In some embodiments, the amount of surfactants present in the stable composition is about 7% by weight based on the total weight of the composition.

In some embodiments, the composition further includes adjuvants such as spreading agents, penetrants, compatibility agents and drift retardants.

In some embodiments, the adjuvant is a non-ionic compound.

An adjuvant is selected from a group consisting of alkyl ethoxylate glycol, alkyl block alkoxylate glycol, alkyl-end-capped ethoxylate glycol, alkyl-end-capped alkyl block alkoxylate glycol, ethoxylated alcohols, phosphated esters, ethoxylated tristyryl phenol phosphate, sorbitan esters, Tween esters and combinations thereof.

In this connection, when a non-ionic surfactant is used as the physical stabilizer, it can also function as an adjuvant.

In some embodiments, the adjuvant is added to the composition as a tank mix, simultaneously or separately.

In some embodiments, the adjuvant is present in an amount of at least 10% by weight based on the total weight of the stable composition. In some embodiments, the adjuvant is present in an amount of at least 15% by weight based on the total weight of the stable composition. In some embodiments, the adjuvant is present in an amount of at least 20% by weight based on the total weight of the stable composition. In some embodiments, the adjuvant is present in an amount of at least 30% by weight based on the total weight of the stable composition.

In some embodiments, the composition further includes additional additives such as sticking agents, thickeners, compatibility agents, buffers, acidifiers and defoaming agents.

Other ingredients, such as adhesives, neutralizers, binders, sequestrates, biocides, stabilizers, buffers preservatives, antioxidants or anti-freeze agents, may also be added to the present compositions in order to increase the stability, density, and viscosity of the described compositions.

In some embodiments, the composition further includes a safener.

In some embodiments, the safener is selected from a group consisting of mefenpyr diethyl, cloquintocet mexyl, fenchlorazole ethyl, benoxacor, dichlormid, isoxadifen ethyl, and any combination thereof.

In some embodiments, the safener is added to the composition as a tank mix, simultaneously or separately.

In some embodiments, the amount of the safener in the stable composition is 0.1-80% by weight based on the total weight of the stable composition. In some embodiments, the amount of safener in the stable composition is 1-50% by weight based on the total weight of the stable composition. In some embodiments, the amount of the safener in the stable composition is 5-25% by weight based on the total weight of the stable composition. In some embodiments, the amount of the safener in the stable composition is 10-15% by weight based on the total weight of the stable composition.

In some embodiments, the ratio between the non-ionic surfactants and the alkoxylated alkyl ether is between 1:1 to 1.5:1.

In some embodiments, the composition comprises clethodim, Agnique® BL 4524, Ethylan™ NS 500 LQ, triethanolamine and Caromax® 28 LN.

In some embodiments, the composition comprises clethodim, Agnique® BL 4524, Ethylan™ NS 500 LQ, butylated hydroxyanisole and Caromax® 28 LN.

In some embodiments, the composition comprises clethodim, Atlox™ 4912, Soprophor® BSU, butylated hydroxyanisole, epoxy methyl soyate and Caromax® 28 LN.

In some embodiments, the composition comprises clethodim, Atlox™ 4912, Soprophor® BSU, butylated hydroxyanisole and Caromax® 28 LN.

In some embodiments, the composition comprises clethodim, Atlox™ 4912, Atlas™ G 5000, epoxy methyl soyate and Solvesso™.

In some embodiments, the composition comprises clethodim, Atlox 4912™, Soprophor® BSU, epoxy methyl soyate and Caromax® 28 LN.

In some embodiments, the composition comprises clethodim, Atlox™ 4912, Soprophor® 796/P, sodium metabisulfite and Solvesso™.

In some embodiments, the composition comprises clethodim, Atlox™ 4912, Soprophor® 796/P, triethanolamine and Solvesso™.

In some embodiments, the composition comprises clethodim, Ethylan™ NS 500 LQ, Alkest® CSO 200796/P, triethanolamine and Solvesso™.

In some embodiments, the composition comprises clethodim, Ethylan™ NS 500 LQ, Alkest® CSO 200796/P, triethanolamine and Caromax® 28 LN.

In some embodiments, the composition comprises clethodim, a mixture of polysorbate 80 (Tween 80) and ethoxylated castor oil, polyalkoxylated butyl ether, triethanolamine and aromatic hydrocarbon.

In some embodiments, the composition comprises clethodim, a mixture of polysorbate 80 (Tween 80) and ethoxylated castor oil, polyalkoxylated butyl ether, butylated hydroxyanisole and aromatic hydrocarbon.

In some embodiments, the composition comprises clethodim, block copolymer of polyethylene glycol and 12-hydroxystearic acid, ethoxylated tristyrylphenol, butylated hydroxyanisole, epoxy methyl soyate and aromatic hydrocarbon.

In some embodiments, the composition comprises clethodim, block copolymer of polyethylene glycol and 12-hydroxystearic acid, ethoxylated tristyrylphenol, butylated hydroxyanisole and aromatic hydrocarbon.

In some embodiments, the composition comprises clethodim, block copolymer of polyethylene glycol and 12-hydroxystearic acid, polyalkylene glycol ether, epoxy methyl soyate and aromatic hydrocarbon.

In some embodiments, the composition comprises clethodim, block copolymer of polyethylene glycol and 12-hydroxystearic acid, ethoxylated tristyrylphenol, epoxy methyl soyate and aromatic hydrocarbon.

In some embodiments, the composition comprises clethodim, block copolymer of polyethylene glycol and 12-hydroxystearic acid, etho-propoxylated tristyrylphenol, sodium metabisulfite and aromatic hydrocarbon.

In some embodiments, the composition comprises clethodim, block copolymer of polyethylene glycol and 12-hydroxystearic acid, etho-propoxylated tristyrylphenol, triethanolamine and aromatic hydrocarbon.

In some embodiments, the composition comprises clethodim, polyalkoxylated butyl ether, castor oil ethoxylate, triethanolamine and aromatic hydrocarbon.

In some embodiments, the composition comprises clethodim, polyalkoxylated butyl ether, castor oil ethoxylate, triethanolamine and aromatic hydrocarbon.

In some embodiments, the composition comprises an amount of clethodim, an amount of fluroxypyr-meptyl ester and at least one non-ionic surfactant. In some embodiments, the composition comprises at least two non-ionic surfactants. In some embodiments, at least one of the non-ionic surfactants is polymeric. In some embodiments, at least one of the non-ionic surfactants is polyalkoxylated butyl ether. In some embodiments, at least one of the non-ionic surfactants is Ethylan™ NS 500 LQ. In some embodiments, at least one of the non-ionic surfactants is Agnique® BL 4524. In some embodiments, the low water miscible organic solvent is an aromatic solvent. In some embodiments, the low water miscible organic solvent is an alkyl-benzene solvent. In some embodiments, the low water miscible organic solvent is Solvesso™. In some embodiments, the amount of clethodim in the composition is from about 100 g/L to about 200 g/L and the amount of fluroxypyr-meptyl ester in the composition is from about 200 g/L to about 300 g/L. In some embodiments, the amount of clethodim in the composition is from about 130 g/L to about 250 g/L and the amount of fluroxypyr-meptyl ester in the composition is from about 280 g/L to about 300 g/L. In some embodiments, the amount of clethodim in the composition is from about 131.6 g/L to about 148.4 g/L and the amount of fluroxypyr-meptyl ester in the composition is from about 273.6 g/L to about 302.4 g/L. In some embodiments, the amount of clethodim in the composition is about 240 g/L and the amount of fluroxypyr-meptyl ester in the composition is about 288 g/L. In some embodiments, the amount of clethodim in the composition is 240 g/L and the amount of fluroxypyr-meptyl ester in the composition is 288 g/L. In some embodiments, the amount of clethodim in the composition is about 10-20% by weight based on the total weight of the composition. In some embodiments, the amount of clethodim in the composition is about 13-15% by weight based on the total weight of the composition. In some embodiments, the amount of clethodim in the composition is about 14% by weight based on the total weight of the composition. In some embodiments, the amount of fluroxypyr-meptyl ester in the composition is about 20-30% by weight based on the total weight of the composition. In some embodiments, the amount of fluroxypyr-meptyl ester in the composition is about 18-29% by weight based on the total weight of the composition. In some embodiments, the amount of fluroxypyr-meptyl ester is about 28.8% by weight based on the total weight of the composition. In some embodiments, the composition comprises about 1-5% by weight of Agnique® BL 4524 based on the total weight of the composition. In some embodiments, the composition comprises about 2-4% by weight of Agnique® BL 4524 based on the total weight of the composition. In some embodiments, the composition comprises about 3% by weight of Agnique® BL 4524 based on the total weight of the composition. In some embodiments, the composition comprises about 1-5% by weight of Ethylan™ NS 500 LQ based on the total weight of the composition. In some embodiments, the composition comprises about 3-4% by weight of Ethylan™ NS 500 LQ based on the total weight of the composition. In some embodiments, the composition comprises about 3.6% by weight of Ethylan™ NS 500 LQ based on the total weight of the composition. In some embodiments, the composition comprises about 20-30% by weight of Solvesso™ 150 based on the total weight of the composition. In some embodiments, the composition comprises about 20-30% by weight of Solvesso™ 150 based on the total weight of the composition. In some embodiments, the composition comprises about 25-30% by weight of Solvesso™ 150 based on the total weight of the composition. In some embodiments, the composition comprises about 20-30% by weight of Solvesso™ 150 based on the total weight of the composition. In some embodiments, the composition comprises about 25-30% by weight of Solvesso™ 150 based on the total weight of the composition. In some embodiments, the composition comprises about 28% by weight of Solvesso™ 150 based on the total weight of the composition. In some embodiments, the composition is an emusifiable concentrate (EC) composition. In some embodiments, the composition has a pH of 4-5. In some embodiments, the composition has a pH of 4.5.

In some embodiments, the stable, liquid composition comprises:
a) clethodim in an amount of about 24% clethodim; b) Solvesso™ in an amount of about 70% by weight based on the total weight of the stable composition; c) Atlox™ 4912 in an amount of about 3.5% by weight based on the total weight of the composition; and (d) alkoxylated castor oil or Soprophor® BSU in an amount of about 3.5% by weight based on the total weight of the composition, wherein the composition is substantially free of ionic surfactant.

In one embodiment, the stable, liquid composition comprises:
a) clethodim in an amount of 10-20% by weight based on the total weight of the stable composition;
b) fluroxypyr meptyl in an amount of 25-35% by weight based on the total weight of the stable composition;
c) low water solubility organic solvent in an amount of 10-90% by weight based on the total weight of the stable composition;
d) non-ionic surfactant selected from a group consisting of polysorbate 80 and ethoxylated castor oil in an amount of 1-5% by weight based on the total weight of the stable composition; and
e) a polyalkoxylated alkyl ether in an amount of 1-5%, wherein the composition is substantially free of ionic surfactant.

In one embodiment, the stable, liquid composition comprises:
a) clethodim in an amount of 10-20% by weight based on the total weight of the stable composition;
b) fluroxypyr-meptyl ester in an amount of 25-35% by weight based on the total weight of the stable composition;
c) low water solubility organic solvent in an amount of 10-90% by weight based on the total weight of the stable composition;
d) non-ionic surfactant selected from a group consisting of polysorbate 80 and ethoxylated castor oil in an amount of 1-5% by weight based on the total weight of the stable composition; and
e) a polyalkoxylated alkyl ether in an amount of 1-5%, wherein the composition is substantially free of ionic surfactant.

In some embodiments, the stable, liquid composition comprising:
(a) clethodim in an amount of about 14% by weight based on the total weight of the stable composition;
(b) fluroxypyr in an amount of about 28% by weight based on the total weight of the stable composition;
(c) Solvesso™ in an amount of about 27% by weight based on the total weight of the stable composition, d) polysorbate 80 and ethoxylated castor oil in an total amount of about 3% by weight based on the total weight of the stable composition; and e) polyalkoxylated butyl ether in an amount of about 3.5%, wherein the composition is substantially free of ionic surfactant.

In some embodiments, the stable, liquid composition comprising:
(a) clethodim in an amount of about 14% by weight based on the total weight of the stable composition;
(b) fluroxypyr-meptyl ester in an amount of about 28% by weight based on the total weight of the stable composition;
c) Solvesso™ in an amount of about 27% by weight based on the total weight of the stable composition,
d) polysorbate 80 and ethoxylated castor oil in an total amount of about 3% by weight based on the total weight of the stable composition; and
e) polyalkoxylated butyl ether in an amount of about 3.5%, wherein the composition is substantially free of ionic surfactant.

In some embodiments, the stable, liquid composition comprising:
(a) clethodim in an amount of about 24% by weight based on the total weight of the composition;
(b) block copolymer of polyethylene glycol and 12-hydroxystearic acid in an amount of about 3.5% by weight based on the total weight of the composition;
(c) ethoxylated tristyrylphenol in an amount of about 3.5% by weight based on the total weight of the composition
(d) Solvesso™ in an amount of about 69% by weight based on the total weight of the composition.

In some embodiments, the stable, liquid composition comprising:
(a) clethodim in an amount of about 24% by weight based on the total weight of the composition;
(b) block copolymer of polyethylene glycol and 12-hydroxystearic acid in an amount of about 3.5% by weight based on the total weight of the composition;
(c) ethoxylated castor oil in an amount of about 3.5% by weight based on the total weight of the composition;
(d) Solvesso™ in an amount of about 69% by weight based on the total weight of the composition.

The present invention also provides a stable, liquid composition comprising:
(a) an amount of clethodim,
(b) an amount of fluroxypyr-meptyl ester,
(c) Agnique® BL 4524,
(d) Ethylan™ NS 500 LQ, and
(e) Solvesso™ 150.

The present invention also provides a stable, liquid composition comprising:
(a) 140 g/L of clethodim,
(b) 288 g/L of fluroxypyr-meptyl ester,
(c) Agnique® BL 4524,
(d) Ethylan™ NS 500 LQ, and
(e) Solvesso™ 150.

The present invention also provides a stable, liquid composition comprising:
(a) 14% by weight of clethodim,
(b) 28.8% by weight of fluroxypyr-meptyl ester,
(c) 3% by weight Agnique® BL 4524,
(d) 3.6% by weight of Ethylan™ NS 500 LQ, and
(e) about 28% by weight of Solvesso™ 150.

In some embodiments, the composition is stable after 7 days in storage. In some embodiments, the composition is stable after 10 days in storage. In some embodiments, the composition is stable after 14 days in storage at a temperature of 54° C.

In some embodiments, the composition is stored at a temperature between 25 to 60° C. In some embodiments, the composition is stored at a temperature between 40 to 55° C. In some embodiments, the composition is stored at a temperature between 50 to 55° C. In some embodiments, the composition is stored at a temperature of 54° C.

In some embodiments, the composition comprises more than 95% of clethodim after storing. In some embodiments, the composition comprises less than 5% degradation of clethodim. In some embodiments, the composition comprises less than 1% degradation of clethodim. In some embodiments, the composition comprises less than 0.5% degradation of clethodim. In some embodiments, the composition comprises less than 0.1% degradation of clethodim. In some embodiments, the composition comprises an undetectable amount degradation of clethodim. In some embodiments, the composition comprises no degradation of clethodim.

Further, the agricultural compositions herein may be used in conjunction with one or more other pesticides to control a wider variety of undesirable pests. When used in conjunction with other pesticides, the herein described composition may be formulated with the other pesticide(s), tank mixed with the other pesticide(s) or applied sequentially with the other pesticide(s). In addition, the herein described composition may, optionally, be combined with or blended with other pesticide composition(s). This blend with pesticide composition(s) may be used to control pests in crops and non-crop environments.

In some embodiments, the composition is chemically stable. In some embodiments, the composition is physically stable.

In some embodiments, the pH of the composition after dilution is less than 7, 6, 5, 4, 3.5 or 3.

In some embodiments, the pH of the composition after dilution is about 4.5.

The present invention provides a stable, liquid composition comprising: (a) an effective amount of a cyclohexanedione oxime compound; (b) a low water miscible organic solvent; (c) at least one non-ionic surfactant; and (d) a polyalkoxylated alkyl ether wherein the composition is substantially free of ionic surfactant.

The present invention provides a stable, liquid composition comprising (a) an effective amount of a cyclohexanedione oxime compound; b) a low water miscible organic solvent; (c) at least one non-ionic surfactant; and (d) a polyalkoxylated alkyl ether with proviso that the composition comprising ionic surfactant is less than 2% by weight based on the total weight of the composition.

The present invention also provides a package comprising any one of the compositions disclosed herein.

Method of Increasing Stability of the Composition

The present invention provides a method for stabilizing a liquid composition comprising a cyclohexanedione oxime compound and low water miscible organic solvent, wherein the method comprises formulating the composition in absence of ionic surfactant and in presence of at least one non-ionic surfactant.

The present invention provides a method for stabilizing a liquid composition comprising a cyclohexanedione oxime compound and low water miscible organic solvent, wherein the method comprises formulating the composition in absence of ionic surfactant and in presence of at least two non-ionic surfactants.

The present invention provides a use of a combination of at least one non-ionic surfactant for stabilizing a liquid composition comprising a cyclohexanedione oxime compound and low water miscible organic solvent.

The present invention provides a use of a combination of at least two non-ionic surfactants for stabilizing a liquid composition comprising a cyclohexanedione oxime compound and low water miscible organic solvent.

The present invention provides a method for increasing the shelf-life, the stability, the herbicidal efficacy or any combination thereof of a composition comprising cyclohexanedione oxime compound, the method comprising formulating the composition to be substantially free of ionic surfactant and using at least one non-ionic surfactant for physical stabilization of the composition.

The present invention provides a method for increasing the shelf-life, the stability, the herbicidal efficacy or any combination thereof of a composition comprising cyclohexanedione oxime compound, the method comprising formulating the composition to be substantially free of ionic surfactant and using at least two non-ionic surfactants for physical stabilization of the composition.

A method for increasing the chemical stability of cyclohexanedione oxime compound comprising reducing the amount of anionic surfactant to equal to or less than 0.2% by weight based on the total weight of the composition.

The present invention provides the use of a combination of at least one non-ionic surfactant and a polyalkoxylated alkyl ether in a liquid composition comprising clethodim to reduce the degradation of clethodim in the liquid composition and to stabilize the liquid composition.

The present invention provides a method for increasing chemical and physical stability of a cyclohexanedione oxime composition comprising excluding an ionic surfactant and adding a polyalkoxylated alkyl ether in the composition.

The present invention provides the use of a combination of at least one non-ionic surfactant and a polyalkoxylated alkyl ether in a liquid composition comprising clethodim to reduce the degradation of clethodim in the liquid composition and to stabilize the liquid composition.

The present invention provides a method for improving the stability of a clethodim composition, wherein the method comprises adding to the clethodim composition a polymeric non-ionic surfactant in an amount that is effective for increasing stability of the clethodim composition.

As used herein, the term "clethodim composition" includes any clethodim composition known in the prior art and any one of the compositions described herein.

In some embodiments, the polymeric non-ionic surfactant is added to a tank mix comprising clethodim.

In some embodiments, the polymeric non-ionic surfactant is added to a diluted clethodim composition.

In some embodiments, the method or use comprises adding at least one low HLB component to the composition. In some embodiments, the method or use comprises adding at least one high HLB component to the composition. In some embodiments, the method or use comprises adding at least two high HLB component to the composition.

The present invention provides a method of physically stabilizing a liquid composition of cyclohexanedione oxime compound in low water miscible organic solvent in absence of ionic surfactant after dilution wherein the method comprises formulating the composition to have a high HLB by using at least one polymeric surfactant having a high HLB value.

The present invention provides a method of physically stabilizing a liquid composition of cyclohexanedione oxime compound in low water miscible organic solvent in absence of ionic surfactant after dilution wherein the method comprises formulating the composition to have a high HLB by using at least two polymeric surfactants wherein at least one surfactant possesses a high HLB value and at least one surfactant possesses a low HLB value.

The present invention also provides the use of at least one polymeric surfactant for physical stabilization after dilution of a liquid composition comprising a cyclohexanedione oxime compound in a low water miscible organic solvent in the absence of ionic surfactant.

The present invention also provides a method for improving the physical stability of a liquid composition comprising a cyclohexanedione oxime compound in a low water miscible organic solvent in the absence of ionic surfactant after dilution wherein the composition comprises a high HLB component and/or surfactant, wherein the method comprises formulating the composition with at least two polymeric surfactants.

In some embodiments, a cyclohexanedione oxime compound is clethodim.

In some embodiments, one of the two non-ionic surfactants is selected from a group consisting of polyalkoxylated sorbitan fatty acid esters and tri block copolymer of poly fatty acids and poly polyalkylene oxide. The second of the non-ionic surfactants is selected from a group consisting of polyalkoxylated plant oil derivatives and polyalkoxylated polyaryl ethers.

In some embodiments, the tri block copolymer of poly fatty acid and poly polyalkylene oxide is a block copolymer of polyethylene glycol and 12-hydroxystearic acid.

In some embodiments, the block copolymer of polyethylene glycol and 12-hydroxystearic acid is Atlox™ 4912.

In some embodiments, polyalkoxylated plant oil is selected from a group consisting of olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, and tall oil.

In some embodiments, the polyalkoxylated sorbitan fatty acid ester wherein the fatty acid is C10-C20.

In some embodiments, the polyalkoxylated sorbitan fatty acid ester is Polysorbate 80 (CAS No. 9005-65-6).

In some embodiments, the polyoxyalkylene polyaryl ether is ethoxylated tristyrylphenol ether.

In some embodiments, the polyoxyalkylene polyaryl ether is a polyoxyalkylene tristyryl phenyl ether. In some embodiments the polyoxyalkylene tristyryl phenyl ether is polyoxyethylene tristyryl phenyl ether. In some embodiments, the polyoxyalkylene tristyryl phenyl ether is polyoxyethylene polyoxypropylene tristyryl phenyl ether.

In some embodiments, the ethoxylated tristyrylphenol is Soprophor® BSU.

In some embodiments, the tri block copolymer of poly fatty acid and poly polyalkylene oxide is a block copolymer of polyethylene glycol and 12-hydroxystearic acid.

In some embodiments, the block copolymer of polyethylene glycol and 12-hydroxystearic acid is Atlox™ 4912.

In some embodiments, the plant oil is selected from a group consisting of olive oil, kapok oil, castor oil, papaya oil, camellia oil, palm oil, sesame oil, corn oil, rice bran oil, peanut oil, cotton seed oil, soybean oil, rapeseed oil, linseed oil, tung oil, sunflower oil, safflower oil, and tall oil.

In some embodiments, the polyalkoxylated sorbitan fatty acid ester is Polysorbate 80 (CAS No. 9005-65-6).

In some embodiments, the polyalkoxylated plant oil derivative is ethoxylated castor oil.

In some embodiments, the ethoxylated castor oil is Emulsogen® EL 360.

In some embodiments, the polyalkoxylated refers to polyalkylene oxide.

Polyalkylene oxides may include but are not limited to ethylene oxide, propylene oxide and butylene oxide.

In some embodiments the weight ratio between the two non-ionic surfactants is from 9:1 to 1:9, In some embodiments, weight ratio between the two non-ionic surfactants is 7:3, In some embodiments, weight ratio between the two non-ionic surfactants is 6:4, preferably, the weight ratio between the two non-ionic surfactants is 1:1.

In some embodiments the weight ratio between the two non-ionic surfactant from 9:1 to 1:9; In some embodiments, weight ratio between the two non-ionic surfactants is 7:3. In some embodiments, weight ratio between the two non-ionic surfactants is 6:4, preferably, the weight ratio between the two non-ionic surfactants is 1:1.

In some embodiments the amount of the at least one non-ionic surfactant ranges from 2.5 to 10% by weight based on the total weight of the composition.

In some embodiments the amount of third non-ionic surfactant ranges from 1 to 5% by weight based on the total weight of the composition.

In some embodiments, the amount of stabilizing system in the composition ranges from about 5% to about 20% by weight based on the total weight of the composition.

In some embodiments, cyclohexanedione oxime compound refers to neutral derivative, agriculturally acceptable salt or ester thereof.

In some embodiments, tri block copolymer of poly fatty acids and poly polyalkylene oxide A-B-A triblocks comprise two polyhydroxystearates and one poly ethylene oxide (ABA)

In some embodiments, the tri block copolymer of poly fatty acid and poly polyalkylene oxide is Atlox® 4912.

In some embodiments, the two non-ionic surfactants are Atlox™ 4912 and Soprophor® BSU.

In some embodiments, the two non-ionic surfactants are Atlox™ 4912 and ethoxylated castor oil.

In some embodiments the two non-ionic surfactants are polyalkoxylated sorbitan fatty acid ester and alkoxylated castor oil.

In some embodiments, the composition further comprises polyalkoxylated alkyl ether.

In some embodiments, wherein the composition comprising additional herbicide(s), the type and amount of the additional herbicide may affect the hydrophilicity/lipophilicity level of the composition and the hydrophilicity/lipophilicity level of the composition need to be adjusted.

In some embodiments, the method comprises adjusting the hydrophilicity/lipophilicity level of the composition.

In some embodiments, the hydrophilicity/lipophilicity level of the composition is adjusted by adding additional non-ionic surfactant(s), using non-ionic surfactants with different HLB, and/or changing the concentration ratio between the surfactants in the composition.

In some embodiments, the hydrophilicity/lipophilicity level can be adjusted by adding additional additive(s) and/or additional active ingredient(s).

In some embodiments, the hydrophilicity/lipophilicity level may be adjusted in a tank mix.

In some embodiments, the non-ionic polymeric surfactant(s) is added into a tank mix.

Methods of Use of the Compositions are Described Herein.

The compositions described herein are suitable for the control of weeds.

The present invention provides a method for eliminating vegetation, comprising the step of contacting said vegetation, or an area susceptible to vegetation growth, with any of the compositions described herein.

The present invention also provides a method of controlling weeds comprising: applying any of the compositions described herein to a weed, a portion of a weed, an area or soil adjacent to a weed, and/or a seed of a weed so as to thereby control the weed.

The present invention also provides a method of controlling and/or preventing weed comprising applying any of the compositions described herein to the weed, a portion of the weed, an area or soil adjacent to a weed, a locus under cultivation, and/or a locus where weed is to be prevented so as to thereby control and/or prevent the weed.

The present invention also provides a method for improving plant yield by preventing and/or controlling weed, wherein the method comprises applying any one of the compositions described herein to a weed, a portion of a weed, an area or soil adjacent to a weed, a locus under cultivation and/or a locus where weed is to prevented and/or controlled so as to thereby improve plant yield by preventing and/or controlling the weed.

In some embodiments, the plant is a crop.

In some embodiments, the composition is diluted in water prior to application. In some embodiments, the diluted composition shows no significant phase separation.

In some embodiments, the composition is applied by foliar spray. In some embodiments, the composition is applied using tractor and spray rig mounted or pulled. In some embodiments, the composition is applied using plane. In some embodiments, the composition is applied using helicopter. In some embodiments, the composition is applied using fixed wing aircraft. In some embodiments, the composition is applied using rotatory wing aircraft.

In some embodiments, the composition is applied at a rate between about 0.6 L/ha to about 1.4 L/ha. In some embodiments, the composition is applied at a rate between about 0.8 L/ha to about 1.2 L/ha. In some embodiments, the composition is applied at a rate of about 1 L/ha.

In some embodiments, the composition is applied pre-planting. In some embodiments, the composition is applied at least once from 21 days before planting to immediately before planting. In some embodiments, the composition is applied after planting. In some embodiments, the composition is applied pre-emergence. In some embodiments, the composition is applied post-emergence. In some embodiments, the composition is applied in pre-planting burndown. Pre-planting burndown occurs after harvest and before the new crop is sown.

In some embodiments, the weed is *Eleusine indica, Digitaria insularis, Bidens* spp, *Amaranthus* spp. *Conyza* spp, Volunteer corn and/or *Ipomaea grandiflora*.

Method of Preparing the Composition are Described Herein

The present invention also provides a method of controlling weeds comprising:
a) obtaining any one of the compositions disclosed herein in low water miscible organic solvent.
b) optionally, diluting with water
c) applying the composition to a weed, a portion of a weed, an area or soil adjacent to a weed, and/or a seed of a weed so as to thereby control the weed.

Methods include adding the composition described herein to a carrier such as water and using the resulting solution containing the herbicidal organic composition for spray applications to control weeds in plant or plant propagation material thereof in crop or non-crop environments. By diluting the stable liquid composition in water, an emulsion may be formed.

Effective application rates of the herbicidal composition cannot generally be defined, as it varies depending upon various conditions such as the type of pesticide, target pest, weather conditions, nature of the soil, and the type of crop.

In one embodiment, the stable liquid composition is generally applied at a rate of about 1 to about 5 L/ha. In a preferred embodiment the stable liquid composition is applied at a rate of about 2 to 3 L/ha. In a specific embodiment the stable liquid composition is applied at a rate of about 2 L/ha. In another specific embodiment the stable liquid composition is applied at a rate of about 3 L/ha. In another specific embodiment the stable liquid composition is applied at a rate of about 2.5 L/ha.

In an embodiment, the stable liquid composition may be diluted in a carrier such as water in an amount of from about 1 to 100 L of the stable composition per 1000 L of water. In a further embodiment, the stable liquid composition may be diluted in a carrier such as water in an amount of from about 1 to 30 L of the stable composition per 1000 L of water. In yet another embodiment, the stable liquid composition may be diluted in a carrier such as water in an amount of from about 5 to 15 L of the stable composition per 1000 L of water.

In some embodiments, the crop plants are broad leaf.

In some embodiments, crop plants may include, but are not limited to, soybean, wheat, barley, rye, sugar beet, legumes and oats.

In another embodiment, the weeds may include, but are not limited to, *Digitaria insularis Eleusine indica, Conyza bonariensis, Conyza canadenses, Conyza sumatrensis, Bidens pilosa, Commelina benghalensis, Luphorbia heterophylla, Spermacoce latifólia, Carapichea ipecacuanha.*

The stable liquid composition described herein may be mixed with water and/or fertilizers and may be applied to a desired locus by any means, such as airplane spray tanks, knapsack spray tanks, cattle dipping vats, farm equipment used in ground spraying (e.g., boom sprayers, hand sprayers), and the like. The desired locus may be soil, plants, and the like.

The present stable liquid composition may include additional crop protection agents, for example insecticides, herbicides, fungicides, bactericides, nematicides, molluscicides, growth regulators, biological agents, fertilizers, or mixtures thereof. When used in conjunction with additional crop protection agents, the composition can be formulated with these co-agents, tank mixed with these co-agents or applied sequentially with these co-agents.

Processes of Preparation for the Compositions Described Herein

The present invention provides a process for preparing any one of the compositions described herein, wherein the process comprises the steps of:
(i) mixing a low water miscible organic solvent with at least one non-ionic surfactant and;
(ii) clethodim is added to the solution of step (i) and the resulting blend is mixed until a solution is obtained.

The process may further include adding at least one alkyl polyalkoxylate ether to step (i).

The process may further include step (iii) of filtering the solution of step (ii) to obtain the stable liquid composition.

In some embodiments, the process may further include use of an additional non-ionic surfactant.

In some embodiments, the additional non-ionic surfactant is alkyl polyalkoxylate ether.

In some embodiments, step (i) includes the addition of at least one additional herbicide.

In some embodiments, step (ii) includes the addition of at least one additional herbicide In some embodiments, the additional herbicide is fluroxypyr meptyl. In some embodiments, the additional herbicide is fluroxypyr-meptyl ester.

The present invention provides a process for preparing a stable liquid composition comprising an effective amount of clethodim and an effective amount of at least one additional herbicide, wherein the process comprises the steps of:
(i) dissolving at least one non-ionic surfactant and herbicidal active ingredient (additional to the cyclohexanedione oxime) in a low water miscible organic solvent to obtain a solution.
(ii) adding the cyclohexanedione oxime herbicide to the solution of step (i); and optionally,
(iii) filtering the solution of step (ii) to obtain the stable liquid composition.

The present invention provides a process for preparing a stable liquid composition comprising an effective amount of clethodim and an effective amount of at least one additional herbicide, wherein the process comprises the steps of.
(ii) dissolving at least one non-ionic surfactant and herbicidal active ingredient (additional to the cyclohexanedione oxime) in a low water miscible organic solvent to obtain a solution.
(ii) adding the cyclohexanedione oxime compound to the solution of step (i); and optionally,
(iii) filtering the solution of step (ii) to obtain the stable liquid composition.

In some embodiments, the low water miscible organic solvent is added during step (ii).

In some embodiments, at least one alkyl polyalkoxylate ether is further added to step (i).

In some embodiments, the process further comprises a step of adding at least one surfactant and/or adjuvant to the solution of step (i) prior to performing step (ii). In some embodiments, the process further comprises a step of adding at least one surfactant and/or adjuvant to the solution of step (ii) prior to performing step (iii).

In some embodiments, the process further comprises a step of adding a thickener to the suspension of step (ii) prior to performing step (iii).

In some embodiments, the process further comprises a step of adding a safener to the solution of step (i) prior to performing step (ii).

In some embodiments, the low water miscible organic solvent is heated to completely dissolve the clethodim and/or the non-ionic surfactant and/or the alkyl polyalkoxy polymer and/or the fluroxypyr meptyl and/or any other cyclohexanedione oxime herbicide in the composition and/or any additives.

In some embodiments, the low water miscible organic solvent is heated to completely dissolve the clethodim and/or the non-ionic surfactant and/or the alkyl polyalkoxy polymer and/or the fluroxypyr-meptyl ester and/or any other cyclohexanedione oxime herbicide in the composition and/or any additives.

In some embodiments, the low water miscible organic solvent is heated to completely dissolve the clethodim and/or the non-ionic surfactant and/or the alkyl polyalkoxy polymer and/or the fluroxypyr meptyl and/or any other cyclohexanedione oxime compound in the composition and/or any additives.

In some embodiments, the low water miscible organic solvent is heated to completely dissolve the clethodim and/or the non-ionic surfactant and/or the alkyl polyalkoxy polymer and/or the fluroxypyr-meptyl ester and/or any other cyclohexanedione oxime compound in the composition and/or any additives.

Additives may include, but are not limited to, safener and adjuvant.

In some embodiments, step (i) is performed at a temperature between 15° C. to 65° C. In some embodiments, step (i) is performed at a temperature of about 20° C., 30° C., 40° C., 50° C. or 60° C.

For the foregoing embodiments, each embodiment disclosed herein is contemplated as being applicable to each of the other disclosed embodiments. In addition, the elements recited in composition embodiments can be used in the method, use and process embodiments described herein.

This invention will be better understood by reference to the Experimental Section which follows, but those skilled in the art will readily appreciate that the specific experiments detailed are only illustrative of the invention as described more fully in the claims which follow thereafter.

Experimental and Results Section

Formulating a stable composition comprising clethodim is particularly challenging because clethodim is very sensitive and rapidly decomposes.

Clethodim is known to be unstable in an ionic environment. However, attempts to formulate physically and chemically stable compositions comprising clethodim in a non-aqueous liquid composition failed numerous times.

General Procedure for Preparation of Clethodim Compositions. (for Examples 1-3)

Aromatic hydrocarbon solvent, at least two non-ionic surfactants and clethodim were mixed to obtain a solution.

Example 1: Chemically and Physically Stable Composition of the Invention

Composition:

| Raw Material | Quantity for 1000 liter |
| --- | --- |
| Clethodim 37% (in Solvesso ™ 150) | 240 Kg (648.6 Kg as 37.5%) |
| Atlox ® 4912 (HLB = 5.5) | 35 Kg |
| Emulsogen ® EL 360- (HLB = 13.5) | 35 Kg |
| Solvesso ™ 150 | Up to 1000 L |

Specifications:

| | |
| --- | --- |
| Clethodim conc. | 240 g/l |
| Density | 0.97 g/ml |
| pH (1% m/v) | 4.30 |
| Emulsion 1.5 %*** m/v (342 ppm) | up to 2% cream, oil residue |

Clethodim concentration after storage of two weeks at 54° C. was more than 95%
Water content is 0.4% w/w This is an example comprising a surfactant system which is a combination of polymeric non-ionic surfactant with low HLB value & non-ionic surfactant with high HLB value.

Example 2. Chemically and Physically Stable Composition of the Invention

Composition:

| Raw Material | Quantity for 1000 liter |
| --- | --- |
| Clethodim 37% (in Solvesso ™ 150) | 240 Kg (648.6 Kg as 37.5%) |
| Atlox ® 4912 (HLB = 5.5) | 35 Kg |
| Soprophor ® BSU (MB = 12.6) | 35 Kg |
| Solvesso ™ 150 | Up to 1000 L |

Specifications:

| | |
| --- | --- |
| Clethodim conc. | 240 g/l |
| Density | 0.97 g/ml |
| pH (1% m/v) | 4.30 |
| Emulsion 1.5%*** m/v (342 ppm) | 2% cream, oil residue |

Clethodim concentration after storage of two weeks at 54° C. was more than 95%
Water content is 0.4% w/w This is another example of a surfactant system which is a combination of polymeric non-ionic surfactant with low HLB value & non-ionic surfactant with high HLB value.

Example 3. Clethodim 240 EC Composition

TABLE 1

| CLETHODIM 240 EC - 4912G | % W/W |
| --- | --- |
| Clethodim tech 37% in Solvesso ™ 150 | 67 |
| Atlox ® 4912 (HLB = 5.5) | 1.34 |
| Atlas ™ G 5000 (HLB = 17) | 5.36 |
| Solvesso ™ 150 ND | 26.3 |
| SUM | 100 |

Specifications:

| | |
| --- | --- |
| Clethodim conc | 240 g/l |
| Density | 0.97 g/ml |
| pH (1% ally) | 4.30 |
| Emulsion 1.5%*** m/v (342 ppm) | 2% cream, traces of oil after 2 hs |

Clethodim concentration after storage of two weeks at 54° C. was more than 95%
Water content is up to 0.4% w/w This is an example comprising a surfactant system which is a combination of two polymeric non-ionic surfactants, one with low HLB value & the other with high HLB value.

Example 4: Stable Composition of the Invention Comprising Clethodim and Fluroxypyr Clethodim 140+Fluroxypyr Meptyl 288 EC
Composition:

| Raw Material | Quantity for 1000 liter |
|---|---|
| Clethodim (A.I., as 100%) | 140.0 Kg (378.40 Kg as 37.5%) |
| Fluroxypyr Meptyl* (A.I. as 100%) | 288.0 Kg (293.9 Kg as 98.0%) |
| Agnique ® BL 4524** | 30.00 Kg |
| Ethylan ® NS 500 LQ (HLB = 14) (Polyalkoxylated Butyl Ether) | 36.00 Kg |
| Solvess ™ 150 | Up to 1000 L (about 280.0 Kg) |

*Fluroxypyr acid equivalent: 200.0 g/l
**Agnique ® BL 4524 is surfactant mixture of Montanox ™ 80 (polysorbate 80, tween 80, HLB = 15) and ethoxylated castor oil. Example 9 showed that combination of ethoxylated castor oil 54 moles EO (HLB = 14) with polysorbate 80 well mimics the function of Agnique ® BL 4524 in the system.

Specifications:

| | |
|---|---|
| Clethodim conc. | 140.00 g/l (131.60-148.40) |
| Fluroxypyr Meptyl conc. | 288.0 g/l (273.60-302.40) |
| Density | 1.0215 g/ml |
| pH (1% m/v) | 4.50 |
| Emulsion 1%** m/v (20 ppm) | 0.8% cream, without oil |
| **According Brazil ABNT Guideline | max. 1% cream, without oil |
| Emulsion 1.5%*** m/v (342 ppm) | 0.8% cream, without oil |
| CIPAC Guideline | No specification for cream, without oil |

***According major recommended dosage for tank mix in the field.

Preparation Method for 1000 Liter:

Aromatic hydrocarbon (Solvesso™ 150), non-ionic surfactants blend (Agnique® BL 4524), block copolymer (Ethylan® NS 500 LQ), and melted fluroxypyr meptyl were mixed. Clethodim was added and the resulting mixture was mixed until complete solubilization. The resulting solution was filtered using a 25-micron filter.

Remarks:
The product is stable at 54° C. (14 days).
Clethodim degradation: 4.13% (w/w)
Fluroxypyr Meptyl degradation: 0.03% (w/w)

This is an example comprises surfactant system which is combination of polymeric non-ionic surfactant with high HLB value & two non-ionic surfactant also with high HLB value. This is to balance the high amount of fluroxypyr meptyl which is amphiphilic, surfactant-like, molecule with high hydrophobicity. It plays the part of the low-HLB surfactant in the system.

Comparative Experiments and Results

In general, degradation of clethodim was found to be associated with ionic surfactants and unstable emulsion was found to be associated with the absence of ionic surfactants.

Combining at least two non-ionic surfactants led to a chemically and physically stable composition.

Different comparative tests were conducted in which tested (1) effect of HLB value on physical stability of composition without ionic surfactant and (2) the effect of stabilizer on chemical stability in presence of ionic surfactant and (3) effect of adding additional ingredient) which effects the HLB of the composition

Example 5. A Non-Physically Stable Composition

Clethodim 240 EC

TABLE 2

| CLETHODIM 240 EC - MNT80NS | % W/W |
|---|---|
| Clethodim tech 37% | 67 |
| Montanox ™ 80 (polysorbates 80) | 2.68 |
| Ethylan ® NS 500 | 4.02 |
| Solvesso ® 150 ND | 26.3 |
| SUM | 100 |

A composition comprises only high HLB non-ionic surfactants in the absence of the second non-ionic surfactant with lower HLB was tested. It was found that the compositions were physically unstable and oily phase was obtained.

Example 6. Chemical Stability of Clethodim in Compositions which Comprise Ionic Surfactants and Further Comprise Additional Stabilizers

TABLE 3

| Variable | Component | Formula # | Clethodim Analysis fresh sample (g/L) | Clethodim Analysis After aging (54 oC/14 days) (g/L) | % of Clethodim degradation |
|---|---|---|---|---|---|
| Stabilizer | HMTA (hexamethyleneteramine) | 01 | 143.58 | 118.85 | 17.22 |
| | Cysteine | 02 | 142.17 | 105.43 | 25.84 |
| | BHT | 03 | 148.02 | 117.25 | 20.78 |
| | Citric Acid | 04 | 146.38 | 27.06 | 81.51 |
| | Triethanolamine | 05 | 149.86 | 119.98 | 18.68 |
| | Sodium Metabisulfite | 06 | 148.71 | 118.26 | 19.19 |
| | Epoxy Methyl Soyate | 07 | 142.12 | 116.51 | 18.02 |
| Ionic Surfactants | Calcium dodecylbenzenesulfonate | 09 | 146.18 | 119.79 | 18.05 |
| | TEA dodecylbenzenesulfonate | 10 | 143.82 | 117.58 | 18.24 |
| | sodium dodecylbenzenesulfonate | 11 | 145.27 | 117.36 | 19.21 |
| | lauryl ether sodium sulphate | 12 | 144.46 | 118.12 | 16.23 |

Table 3 demonstrates a set of experiments which were conducted to test the effect of chemical stabilizer on the clethodim's degradation in the presence of an anionic surfactant.

General procedure to produce 1000 ml of formulated product:

467 g of a solution at 30% Clethodim in Solvesso™ 150 was mixed with 411.5 g of fluroxypyr meptyl ester 98%; 43 g of dodecylbenzene sulfonate calcium salt (anionic surfactant). add 110 g of ethoxylated tristyrylphenol 16EO; 50 g of castor oil 40EO. The resulting mixture was mixed until complete solubilization.

The described composition was mixed with the different stabilizers (2000 ppm of 1 to 7) and the clethodim's degradation was measured.

It was found that the Clethodim degradation after aging was higher than 5%. The results showed that a stabilizer is not enough to prevent clethodim degradation in the presence of ionic surfactant.

In the same table (compositions 9 to 12) it is possible to see that replacing the ionic surfactant (dodecylbenzene sulfonate calcium salt) using the above procedure, the degradation still remains higher than 5% and there are not significant variations between different ionic surfactants.

Example 7-8. Compositions of Clethodim and Fluroxypyr (30% by Weight), which are Free of Ionic Surfactant and Comprising Combination of Alkoxylated Castor Oil and Alkoxylate Alkyl Ether

TABLE 4

| Formula #<br>Raw material | Degradation<br>level<br>Lote das MPs | F-016/17<br>(g) | (g) |
|---|---|---|---|
| Fluroxypyr Meptyl 98% | F006G6UE02 | 29.48 | 29.48 |
| Clethodim 35% in Solvesso 150 | 1605391 | 37.84 | 37.84 |
| ALKEST ® CSO 200, Castor Oil 20 EO | | 3.00 | |
| Ethylan ® NS 500 | | 3.6 | 3.60 |
| Solvesso ™ 150 | | 28.0 | 28.00 |
| ALKEST ® CSO 400, Castor Oil 40 EO | | | 3.0 |
| Degradation level | | 5.47% | 5.56% |

Chemical and physical stability were tested and it was found that the clethodim is chemically stable, however, the composition was found physically untestable according to CIPAC standard. Fluroxapyr meptyl, effects the hydropilicy/lipophilicity level of the composition. Adjusting the hydropilicy/lipophilicity level is required. optionally with a third non-ionic surfactant with higher HLB value.

Example 9. Different Ethoxylated Castor Oils in Compositions Comprising Clethodim and Fluroxypyr were Conducted to Compare the Physical Stability of Said Compositions Tests using different ethoxylated castor oils in compositions comprising clethodim and fluroxypyr were conducted to compare the physical stability of said compositions. The objective of these tests was to determine the relationship between the degree of ethoxylation of the ethoxylated castor oil used and the physical stability of the composition.

Formulations 1-4 and STD have the same composition except for the non-ionic surfactants used. Formulations 1-4 each contains 1.5% polysorbate 80 (Tween 80) and 1.5% ethoxylated castor oil with varying degrees of ethoxylation as showed in Table 7. Formulation STD contains 3% Agnique® BL 4524, sold by BASF. Agnique® BL 4524 is a mixture of polysorbate 80 (Tween 80) and ethoxylated castor oil but the ratio of polysorbate 80 (Tween 80) to ethoxylated castor oil and the degree of ethoxylation of the ethoxylated castor oil are unknown.

TABLE 5

| Formulation | Castor Oil | HLB | % of cream in soft water (2o ppm) after 2 hs |
|---|---|---|---|
| 1 | 5 EO | 4.0 | 3 |
| 2 | 20 EO | 9.5 | 2 |
| 3 | 40 EO | 12.5 | 1.2 |
| 4 | 54 EO | 14.0 | 0.8 |
| STD | (Agnique BL 4524) | | 0.6 |

Specification: % of cream: <1% after 2 h.

The emulsion stability increases proportionally with the increase in the degree of ethoxylation of the castor oil. The results of % of cream in the STD (Agnique® BL 4524) is similar to the result using castor oil 54 EO.

The HLB of the solvent combinations can be influenced by the presence of amphiphilic AI (composed of hydrophilic and hydrophobic portions), for example fluroxypyr-meptyl. The HLB combination need to be adjusted in accordance with the solvents and AIs used in the formulation. For example, fluroxypyr-meptyl acts as a low HLB compound and surfactants with higher HLB are needed to balance the formulation.

Example 10. Chemical Stability Vs. Water Content was Tested

Chemical stability of compositions of example 4 with range of water concentration, was tested.

Table 6 shows that the compositions disclosed herein are stable although the amount of water was increased.

TABLE 6

| Formulation # | Water (%) in the final formulation | Result (g/L) | % of degradation |
|---|---|---|---|
| STD formulation (before aging) | 0 | 141.5 | 0 |
| STD formulation (after aging) | 0 | 135.57 | 4.19 |
| Formulation of Example 1 | 1 | 134.71 | 4.81 |
| Formulation of Example 1 | 1.5 | 134.58 | 4.89 |
| Formulation of Example 1 | 1.7 | 129.38 | 8.56 |
| Formulation of Example 1 | 2 | 125.54 | 11.28 |

CONCLUSION

Trial results clearly showed that compositions comprising clethodim in low water miscible organic solvent without ionic surfactant are stable in the presence of combination of at least two non-ionic surfactants and the HLB combination need to be adjusted in accordance with the solvents, AIs and type of surfactants (polymeric, non-polymeric) used in the formulation.

While the present subject matter has been shown and described with reference to preferred embodiments thereof, it will be understood by those skilled in the art that many alternatives, modifications and variations may be made thereto without departing from the spirit and scope thereof. Accordingly, it is intended to embrace all such alternatives, modifications, and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference.

The invention claimed is:

1. A physically stable, liquid composition comprising (a) an amount of clethodim; (b) a low water miscible organic solvent; (c) an amount of at least one non-ionic surfactant having a hydrophilic-lipophilic balance (HLB) of 9 or higher, and (d) an amount of fluroxypyr-meptyl ester,
   wherein the amount of the at least one non-ionic surfactant having a hydrophilic-lipophilic balance (HLB) of 9 or higher and the amount of the fluroxypyr-meptyl ester are sufficient to physically stabilize the liquid composition comprising the amount of clethodim, and
   wherein the clethodim is chemically stable in the liquid composition and the liquid composition is substantially free of ionic surfactants.

2. The composition of claim 1, wherein:
   a. at least one of the non-ionic surfactants is polymeric,
   b. the composition comprises at least two non-ionic surfactants wherein at least one of the non-ionic surfactants has a high HLB of 9 or higher and at least one of the non-ionic surfactants has a low HLB of 12 or lower, wherein the high HLB non-ionic surfactant has an HLB that is higher than the low HLB non-ionic surfactant, and/or
   c. at least one of the non-ionic surfactants is selected from the group consisting of alkyl phenol ethoxylates, hydrogenated castor oil ethoxylates, tallow amine ethoxylates, natural and synthetic alcohol ethoxylates, C6-C20 alcohol ethoxylates, alcohol ethoxylate blends, secondary alcohol ethoxylates, PEG's (polyethylene glycols) oleyl amine ethoxylates, COCO amine ethoxylates, stearyl amine ethoxylates, polyalkoxylated alkyl ether, alkyl alkoxylated ether, sorbitan ester, sorbitan ester ethoxylates, polyalkoxylated plant oil, castor oil ethoxylates, EO-PO block copolymers/polymers, EO-PO-EO block copolymers/polymers, ABA block copolymers/polymers, random copolymers/polymers, star copolymers/polymers, graft copolymers/polymers, modified acrylic & vinylic polymers/copolymers, coco-, oleic-, stearic-, tall oil fatty-acid ethoxylates, cocamide monoethanolamine (MEA), cocamide diethanolamine (DEA), cocamide monoisopropanolamine (MIPA), ethoxylated tristyrylphenols, etho-propoxylated tristyrylphenols, etho-propoxylated fatty alcohols, etho-propoxylated alkylphenols, sorbitan_ polyoxyethylene monooleate, polyalkylene glycol ether, polyalkoxylated sorbitan fatty acid ester, polyoxyalkylene polyaryl ether, polyalkoxylated plant oil derivative, carboxylic amides, monoalkanolamine condensates, polyoxyethylene fatty acid amides and any combination thereof.

3. The composition of claim 2, wherein:
   (i) the polymeric non-ionic surfactant is selected from the group consisting of EO-PO block copolymers/polymers, EO-PO-EO block copolymers/polymers, ABA block copolymers/polymers, random copolymers/polymers, star copolymers/polymers, graft copolymers/polymers, polyalkoxylated alkyl ether, and any combination thereof,
   (ii) the high HLB non-ionic surfactant is selected from the group consisting of castor oil ethoxylates, ethoxylated tristyrylphenols, etho-propoxylated tristyrylphenols, sorbitan esters, sorbitan ester ethoxylates, etho-propoxylated fatty alcohols, etho-propoxylated alkylphenols, polyalkoxylated butyl ether, polyoxyethylenesorbitan monooleate and polyalkylene glycol ether, and/or
   (iii) the low HLB non-ionic surfactant is selected from the group consisting of ABA block copolymers/polymers, EO-PO block copolymers/polymers, EO-PO-EO block copolymers/polymers, random copolymers/polymers and star copolymers/polymers/polymers.

4. The composition of claim 1, wherein:
   a. one of the non-ionic surfactants is an ethoxylated compound,
   b. one of the non-ionic surfactants is monomeric,
   c. one of the non-ionic surfactants is a tri block copolymer of poly fatty acid and poly polyalkylene oxide,
   d. one of the non-ionic surfactants is polyalkoxylated sorbitan fatty acid ester,
   e. one of the non-ionic surfactants is a polyalkoxylated plant oil derivative, and/or
   f. one of the non-ionic surfactants is polyalkoxylated polyaryl ether.

5. The composition of claim 4, wherein:
   a. the ethoxylated compound comprises at least 20 EO, at least 40 EO, or at least 50 EO,
   b. the monomeric non-ionic surfactant is a sorbitan ester ethoxylate or a castor oil ethoxylate,
   c. the tri block copolymer of poly fatty acid and poly polyalkylene oxide is a block copolymer of polyethylene glycol and 12-hydroxystearic acid,
   d. the polyalkoxylated sorbitan fatty acid ester is polysorbate 80,
   e. the polyalkoxylated plant oil derivative is alkoxylated castor oil, and/or
   f. the polyalkoxylated polyaryl ether is ethoxylated tristyrylphenol.

6. The composition of claim 1, wherein the composition comprises at least two non-ionic surfactants wherein the first non-ionic surfactant is selected from a group consisting of polyalkoxylated sorbitan fatty acid esters and tri block copolymers of poly fatty acid and poly polyalkylene oxide and the second non-ionic surfactant is selected from a group consisting of polyalkoxylated plant oil derivatives and polyalkoxylated polyaryl ethers.

7. The composition of claim 1, wherein the composition comprises two non-ionic surfactants, wherein:
   a. the two non-ionic surfactants are a block copolymer of polyethylene glycol and 12-hydroxystearic acid and ethoxylated castor oil,
   b. the two non-ionic surfactants are a block copolymer of polyethylene glycol and 12-hydroxystearic acid and ethoxylated tristyrylphenol, or
   c. the two non-ionic surfactants are polyalkoxylated sorbitan fatty acid ester and alkoxylated castor oil.

8. The composition of claim 1, wherein:
   a. the composition further comprises at least one chemical stabilizing agent,
   b. the composition further comprises a photo stabilizer agent,
   c. the low water miscible organic solvent has a dielectric constant of less than 10,
   d. the low water miscible organic solvent comprises at least one aromatic solvent, and/or e. the concentration of the clethodim is between 50 to 400 g/L.

9. The composition of claim 8, wherein the composition comprises at least one chemical stabilizing agent and the chemical stabilizing agent is selected from the group consisting of butylated hydroxytoluene, phenolic antioxidant, alkyl-hydroxy-benzophenones, alkyl-salicylates, thymol, propyl gallate, tert-butyl-hydro-quinone, titanium dioxide, hexamethyleneteramine, cysteine, ascorbic-acid, citric acid, tetraterpenoids, tocopherols, alkyl hydroxy anisoles, triethanolamine, sodium metabisulfite, epoxy methyl soyate, and any combination thereof.

10. The composition of claim 1, wherein the composition comprises:
    a) clethodim in an amount of 10-20% by weight based on the total weight of the stable composition; fluroxypyr-meptyl ester in an amount of 25-35% by weight based on the total weight of the stable composition; low water miscible organic solvent in an amount of 10-90% by weight based on the total weight of the stable composition; non-ionic surfactant selected from a group consisting of polyalkoxylated sorbitan fatty acid ester and ethoxylated castor oil in an amount of 1-5% by weight based on the total weight of the stable composition; and a polyalkoxylated alkyl ether in an amount of 1-5%,
    b) clethodim in an amount of about 14% by weight based on the total weight of the stable composition; fluroxypyr meptyl ester in an amount of about 28% by weight based on the total weight of the stable composition; an alkyl-benzene solvent in an amount of about 27% by weight based on the total weight of the stable composition; polyalkoxylated sorbitan fatty acid ester and ethoxylated castor oil in a total amount of about 3% by weight based on the total weight of the stable composition; and polyalkoxylated butyl ether in an amount of about 3.5%,
    c) clethodim in an amount of about 24% by weight based on the total weight of the composition; block copolymer of polyethylene glycol and 12-hydroxystearic acid in an amount of about 3.5% by weight based on the total weight of the composition; ethoxylated tristyrylphenol in an amount of about 3.5% by weight based on the total weight of the composition; and an alkyl-benzene solvent in an amount of about 69% by weight based on the total weight of the composition, or
    d) clethodim in an amount of about 24% by weight based on the total weight of the composition; block copolymer of polyethylene glycol and 12-hydroxystearic acid in an amount of about 3.5% by weight based on the total weight of the composition; ethoxylated castor oil in an amount of about 3.5% by weight based on the total weight of the composition; and an alkyl-benzene solvent in an amount of about 69% by weight based on the total weight of the composition.

11. The composition of claim 1, wherein the composition comprises:
    (a) 14% by weight of clethodim,
    (b) 28.8% by weight of fluroxypyr-meptyl ester,
    (c) 3% by weight of castor oil ethoxylate,
    (d) 3.6% by weight of polyalkoxylated alkyl ether, and
    (e) about 28% by weight of an alkyl-benzene solvent.

12. A package comprising the composition of claim 1.

13. The composition of claim 1, wherein the composition comprises at least two non-ionic surfactants.

14. The composition of claim 1, wherein the molar ratio between clethodim and fluroxypyr-meptyl ester is from 1:2 to 1:4.

15. The composition of claim 1, wherein the at least one non-ionic surfactant has a HLB of greater than 12, and wherein the molar ratio between clethodim and fluroxypyr-meptyl ester is from 1:2 to 1:4.

16. The composition of claim 15, wherein the composition is free of ionic surfactant.

17. The composition of claim 1, wherein at least one non-ionic surfactant has a HLB of greater than 12.

18. The composition of claim 1, wherein the composition is free of ionic surfactant.

19. The composition of claim 1, wherein:
    a. the low water miscible organic solvent comprises an alkyl-benzene solvent,
    b. the concentration of the clethodim is about 140 g/L, about 240 g/L, about 360 g/L or about 400 g/L, and/or
    c. the composition further comprises at least one chemical stabilizing agent which is a paraben and/or a carotenoid.

20. The composition of claim 1, wherein the liquid composition is an emulsifiable concentrate, an oil in water emulsion or a water in oil emulsion, wherein the emulsifiable concentrate, the oil in water emulsion or the water in oil emulsion results in a cream concentration equal or less than 2% after 2 hours both before and after storage for two weeks at 54° C. and/or after 8 weeks storage at 40° C. according to CIPAC standard MT 36.3, and wherein no more than 6% decomposition of the clethodim is observed after storage at 54° C. for 14 days.

21. A process for preparing the composition of claim 1, wherein the process comprises the steps of:
    (i) mixing a low water miscible organic solvent with at least one non-ionic surfactant to obtain a solution; and
    (ii) adding clethodim to the solution of step (i) and mixing until a solution is obtained to obtain the stable liquid composition,
    wherein step (i) and/or step (ii) includes the addition of fluroxypyr-meptyl ester.

22. The process of claim 21, wherein:
    a. the process further comprises a step of filtering the solution of step (ii) to obtain the stable liquid composition, and/or
    b. step (i) comprises the addition of alkyl polyalkoxylate ether to the low water miscible organic solvent and non-ionic surfactant.

23. A method for eliminating vegetation, comprising the step of contacting said vegetation, or an area susceptible to vegetation growth, with the composition of claim 1.

24. A method for controlling and/or preventing weed comprising applying the composition of claim 1 to the weed, a portion of the weed, an area or soil adjacent to a weed, a seed of a wee, a locus under cultivation, and/or a locus where weed is to be prevented so as to thereby control and/or prevent the weed.

* * * * *